(12) United States Patent
Zhu et al.

(10) Patent No.: US 10,419,983 B2
(45) Date of Patent: Sep. 17, 2019

(54) MEC PLATFORM HANDOVER METHOD, APPARATUS, AND SYSTEM

(71) Applicant: HUAWEI TECHNOLOGIES CO., LTD., Shenzhen, Guangdong (CN)

(72) Inventors: Qianghua Zhu, Beijing (CN); Chunshan Xiong, Beijing (CN); Xiaoyan Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/958,323

(22) Filed: Apr. 20, 2018

(65) Prior Publication Data

US 2018/0242204 A1    Aug. 23, 2018

Related U.S. Application Data

(63) Continuation of application No. PCT/CN2015/092463, filed on Oct. 21, 2015.

(51) Int. Cl.
*H04W 4/00* (2018.01)
*H04W 36/00* (2009.01)
(Continued)

(52) U.S. Cl.
CPC ....... *H04W 36/0033* (2013.01); *H04W 36/00* (2013.01); *H04W 36/023* (2013.01);
(Continued)

(58) Field of Classification Search
None
See application file for complete search history.

(56) References Cited

U.S. PATENT DOCUMENTS

2004/0068446 A1* 4/2004 Do .................. G06Q 20/32
705/27.1
2010/0142488 A1  6/2010 Zhang et al.
(Continued)

FOREIGN PATENT DOCUMENTS

CN    101369912 A    2/2009
CN    101370266 A    2/2009
(Continued)

OTHER PUBLICATIONS

Giust, Fabio (NEC Europe Ltd.), "MEC Mobility Management," ETSI Draft; European Telecommunications Standards Institute (ETSI),XP014250180, Jul. 14, 2015, 10 pgs.
(Continued)

*Primary Examiner* — Farah Faroul
(74) *Attorney, Agent, or Firm* — Staas & Halsey, LLP

(57) ABSTRACT

Embodiments of the present invention relate to the communications field, and provide an MEC platform handover method, apparatus, and system. The method includes: receiving a handover notification sent by a handover notification device, where the handover notification device is a source access network device of to-be-handed-over UE or a target MEC platform of the to-be-handed-over UE; determining a TEID of the to-be-handed-over UE according to the handover notification; obtaining context of the to-be-handed-over UE according to the TEID of the to-be-handed-over UE; and sending the context to the target MEC platform. The present invention resolves a problem that provision of application data by an MEC platform to UE is interrupted when the UE is being handed over between access network devices, thereby providing continuous services to the UE. The present invention is applicable to a handover between MEC platforms.

16 Claims, 13 Drawing Sheets

(51) Int. Cl.
*H04W 76/12* (2018.01)
*H04W 76/11* (2018.01)
*H04W 36/02* (2009.01)
*H04W 36/18* (2009.01)

(52) U.S. Cl.
CPC ............ *H04W 36/18* (2013.01); *H04W 76/11* (2018.02); *H04W 76/12* (2018.02)

(56) References Cited

U.S. PATENT DOCUMENTS

| | | | |
|---|---|---|---|
| 2011/0075675 A1* | 3/2011 | Koodli | .................... H04L 12/14 |
| | | | 370/401 |
| 2012/0252355 A1 | 10/2012 | Huang et al. | |
| 2012/0320733 A1 | 12/2012 | Zhao et al. | |
| 2012/0327803 A1 | 12/2012 | Lee et al. | |
| 2014/0022996 A1* | 1/2014 | Punz | ........................ H04W 8/12 |
| | | | 370/328 |
| 2014/0362775 A1* | 12/2014 | Steiner | ................. G06F 9/45558 |
| | | | 370/329 |
| 2015/0092665 A1 | 4/2015 | Choi et al. | |
| 2016/0374095 A1* | 12/2016 | Jeon | ......................... H04L 41/04 |
| 2018/0007571 A1* | 1/2018 | Chandramouli | ...... H04W 24/04 |
| 2018/0035360 A1* | 2/2018 | Rasanen | ................. H04W 8/06 |
| 2018/0041958 A1* | 2/2018 | Narayanan | ............. H04W 76/28 |
| 2018/0077294 A1* | 3/2018 | Rasanen | ............. H04L 12/1407 |
| 2018/0249317 A1* | 8/2018 | Kurasugi | ................ H04W 8/18 |
| 2019/0045409 A1* | 2/2019 | Rasanen | ............ H04W 36/0016 |

FOREIGN PATENT DOCUMENTS

| | | |
|---|---|---|
| CN | 101621838 A | 1/2010 |
| CN | 101998566 A | 3/2011 |
| CN | 103229547 A | 7/2013 |
| EP | 3324659 A1 | 5/2018 |
| WO | 2007038947 A1 | 4/2007 |
| WO | 2010/107353 A1 | 9/2010 |

OTHER PUBLICATIONS

Huawei Technologies France,"Use case:gaming and low latency cloud applications," European Telecommunications Standards Institute (ETSI) draft, MEC(15)000035r2, XP014238750, Mar. 19, 2015, 3 pgs.

"Mobile-Edge Computing (MEC);Technical Requirements," Draft ETSI GS MEC 002 V0.4.2, Jul. 2015, XP014250312, 41 pgs.

Extended European Search Report dated Jul. 3, 2018, in corresponding European Patent Application No. 15906463.3, 11 pgs.

Fabio Giust, "MEC Mobility Management," MEC(15)00165, ETSI, Jul. 14, 2015 (11 pp.).

Office Action, dated Feb. 26, 2019, in Japanese Application No. 2018520582 (6 pp.).

International Search Report dated Jul. 13, 2016 in corresponding International Patent Application No. PCT/CN2015/092463.

* cited by examiner

MEC PLATFORM HANDOVER METHOD, APPARATUS, AND SYSTEM

CROSS-REFERENCE TO RELATED APPLICATIONS

This application is a continuation of International Application No. PCT/CN2015/092463, filed on Oct. 21, 2015, the disclosure of which is hereby incorporated by reference in its entirety.

TECHNICAL FIELD

The present invention relates to the communications field, and in particular, to an MEC platform handover method, apparatus, and system.

BACKGROUND

A mobile edge computing (MEC) server is a node newly added in a mobile communications network. The MEC server is usually deployed on a user plane interface between an access network device and a core network access gateway. For example, in a $4^{th}$-generation mobile communications technology, the access network device may be an evolved access network device, and the core network access gateway may be a serving gateway (SGW). The MEC server includes an MEC platform and multiple applications deployed on the MEC platform. The MEC platform, as a core of the MEC server, can manage the multiple applications, and can provide services to the multiple applications. User equipment (UE) can obtain, from the MEC platform by using a radio access network (RAN), application data provided by the applications.

In the related art, an MEC server and an access network device are correspondingly deployed. Usually, one MEC server is deployed on a user plane interface between each access network device and a core network access gateway, and the MEC server can communicate with the corresponding access network device. After accessing the access network device, UE can obtain, by using the access network device, related application data from the MEC server corresponding to the access network device.

However, when UE is being handed over from a source access network device to a target access network device, because the source access network device and the target access network device correspond to different MEC servers, provision of application data by a source MEC server to the UE is interrupted, resulting in poor continuity of obtaining application data by the UE from an MEC server.

SUMMARY

To resolve the problem in the related art, the present invention provides a mobile edge computing (MEC) platform handover method, apparatus, and system. The technical solutions are as follows:

According to a first aspect, a mobile edge computing (MEC) platform handover method is provided. The method is performed by a source MEC platform of to-be-handed-over user equipment (UE). The method includes:

receiving a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE;

determining a tunnel endpoint identifier (TEID) of the to-be-handed-over UE according to the handover notification;

obtaining context of the to-be-handed-over UE according to the TEID of the to-be-handed-over UE, where the context includes information about a source application that is providing a service to the to-be-handed-over UE; and sending the context to the target MEC platform.

With reference to the first aspect, in a first possible embodiment of the first aspect, when the handover notification device is the source access network device, the handover notification includes the TEID of the to-be-handed-over UE and an identifier of a target access network device of the to-be-handed-over UE; and the sending the context to the target MEC platform includes:

determining a target MEC platform corresponding to the target access network device according to the identifier of the target access network device and a preset correspondence between a target access network device and an MEC platform; and sending the context to the target MEC platform.

With reference to the first aspect, in a second possible embodiment of the first aspect, when the handover notification device is the target MEC platform of the to-be-handed-over UE, the handover notification includes an identifier of the to-be-handed-over UE; and the determining a TEID of the to-be-handed-over UE according to the handover notification includes:

sending a request message to the source access network device, where the request message is used to obtain the TEID of the to-be-handed-over UE, and the request message includes the identifier of the to-be-handed-over UE; and receiving a first response message sent by the source access network device, where the first response message carries the TEID of the to-be-handed-over UE.

With reference to any one of the first aspect, the first possible embodiment of the first aspect, or the second possible embodiment of the first aspect, in a third possible embodiment of the first aspect, the context further includes a routing rule for the to-be-handed-over UE, and the routing rule for the to-be-handed-over UE is used to indicate a rule by which the target MEC platform processes application data of the to-be-handed-over UE; and the routing rule is further used to indicate a rule by which the target MEC platform processes uplink data of the to-be-handed-over UE.

With reference to the first possible embodiment of the first aspect, in a fourth possible embodiment of the first aspect, after the sending the context of the to-be-handed-over UE to the target MEC platform, the method further includes:

receiving a second response message sent by the target MEC platform, where the second response message is used to instruct the target MEC platform to complete update of a routing rule; and sending a handover response to the source access network device according to the second response message, where the handover response is used to instruct the source MEC platform to complete a platform handover for the to-be-handed-over UE.

With reference to any one of the first aspect, or the first to the fourth possible embodiments of the first aspect, in a fifth possible embodiment of the first aspect, after the sending the context to the target MEC platform, the method further includes:

receiving a resource release message sent by the target MEC platform, where the resource release message includes the identifier of the to-be-handed-over UE; and releasing a resource of the to-be-handed-over UE according to the resource release message.

According to a second aspect, a mobile edge computing (MEC) platform handover method is provided. The method is performed by a handover notification device, and the handover notification device is a source access network device of to-be-handed-over user equipment (UE) or a target MEC platform of the to-be-handed-over UE. The method includes:

generating a handover notification when determining that the to-be-handed-over UE needs to be handed over between access network devices, where the handover notification is used to instruct a source MEC platform of the to-be-handed-over UE to perform platform handover for the to-be-handed-over UE; and sending the handover notification to the source MEC platform.

With reference to the second aspect, in a first possible embodiment of the second aspect, when the handover notification device is the source access network device of the to-be-handed-over UE, the generating a handover notification when determining that the to-be-handed-over UE needs to be handed over between access network devices includes:

receiving a measurement report sent by the to-be-handed-over UE;

determining, according to the measurement report, that the to-be-handed-over UE needs to be handed over between the access network devices; and generating the handover notification, where the handover notification includes a TEID of the to-be-handed-over UE and an identifier of a target access network device of the to-be-handed-over UE.

With reference to the second aspect, in a second possible embodiment of the second aspect, when the handover notification device is the target MEC platform of the to-be-handed-over UE, the generating a handover notification when determining that the to-be-handed-over UE needs to be handed over between access network devices includes:

receiving a handover instruction sent by a target access network device of the to-be-handed-over UE, where the handover instruction includes an identifier of the to-be-handed-over UE and an identifier of the source access network device of the to-be-handed-over UE, and the handover instruction is used to indicate that the to-be-handed-over UE needs to be handed over between the access network devices; and generating the handover notification according to the handover instruction, where the handover notification includes the identifier of the to-be-handed-over UE; and the sending the handover notification to the source MEC platform includes:

determining a source MEC platform corresponding to the source access network device according to the identifier of the source access network device and a preset correspondence between a source access network device and an MEC platform; and sending the handover notification to the source MEC platform.

With reference to the first possible embodiment of the second aspect, in a third possible embodiment of the second aspect, after the sending the handover notification to the source MEC platform, the method further includes:

receiving a handover response sent by the source MEC platform, where the handover response is used to instruct the source MEC platform to complete a platform handover for the to-be-handed-over UE; and sending a handover instruction to the to-be-handed-over UE according to the handover response, where the handover instruction is used to instruct the to-be-handed-over UE to be handed over to the target access network device.

Before receiving the handover response sent by the source MEC platform, if the source access network device has received a handover response sent by the target access network device, the source access network device may start a timer. If the handover response sent by the source MEC platform is not received within a time period preset on the timer, the source access network device sends the handover instruction to the to-be-handed-over UE. Alternatively, if the handover response sent by the source MEC platform is received within a time period preset on the timer, the source access network device immediately sends the handover instruction to the to-be-handed-over UE.

According to a third aspect, a mobile edge computing (MEC) platform handover method is provided. The method is performed by a target MEC platform of to-be-handed-over user equipment (UE). The method includes:

receiving context sent by a source MEC platform, where the context includes information about a source application that is providing a service to the to-be-handed-over UE; and obtaining, according to the information about the source application, application data of the to-be-handed-over UE from an application deployed on the target MEC platform.

With reference to the third aspect, in a first possible embodiment of the third aspect, the information about the source application includes an identifier of the source application, a control plane (CP) Internet Protocol (IP) address of the source application, and an IP of the to-be-handed-over UE.

With reference to the first possible implementation of the third aspect, in a second possible implementation of the third aspect, the obtaining application data of the to-be-handed-over UE from an application deployed on the target MEC platform includes:

obtaining, from the target MEC platform, a target application corresponding to the identifier of the source application;

sending a notification message to the target application, where the notification message includes the CP IP of the source application and the IP of the to-be-handed-over UE, and the notification message is used to instruct the target application to obtain the application data of the to-be-handed-over UE; and receiving the application data of the to-be-handed-over UE that is sent by the target application, where the application data of the to-be-handed-over UE is obtained by the target application from the source application according to the CP IP of the source application and the IP of the to-be-handed-over UE.

With reference to any one of the third aspect, or the first or the second possible embodiment of the third aspect, in a third possible embodiment of the third aspect, the context further includes a routing rule for the to-be-handed-over UE, and the routing rule for the to-be-handed-over UE is used to indicate a rule by which the target MEC platform processes the application data of the to-be-handed-over UE; and the method further includes:

updating, according to the routing rule for the to-be-handed-over UE, a routing rule stored on the target MEC platform.

After receiving the context of the to-be-handed-over UE, the target MEC platform first updates the routing rule for the to-be-handed-over UE. In this way, when the target MEC platform receives uplink data of the to-be-handed-over UE before obtaining the application data of the to-be-handed-over UE because a handover procedure between access network devices is performed relatively quickly, the uplink data of the UE may be buffered according to the updated routing rule. After completing synchronization of the application data of the to-be-handed-over UE, the target MEC platform then processes the buffered uplink data.

With reference to the third possible embodiment of the third aspect, in a fourth possible embodiment of the third aspect, after the obtaining, according to the information about the source application, application data of the to-be-handed-over UE from an application deployed on the target MEC platform, the method further includes:

performing buffering processing on the application data of the to-be-handed-over UE according to the routing rule for the to-be-handed-over UE; and sending the application data of the to-be-handed-over UE that undergoes the buffering processing to the to-be-handed-over UE.

With reference to any one of the third aspect, or the first to the fourth possible embodiments of the third aspect, in a fifth possible embodiment of the third aspect, after the obtaining, according to the information about the source application, application data of the to-be-handed-over UE from an application deployed on the target MEC platform, the method further includes:

sending a resource release message to the source MEC platform, where the resource release message includes an identifier of the to-be-handed-over UE, and is used to instruct the source MEC platform to release a resource of the to-be-handed-over UE.

According to a fourth aspect, a mobile edge computing (MEC) platform handover apparatus is provided. The apparatus is located on a source MEC platform of to-be-handed-over user equipment (UE). The apparatus includes:

a first receiving unit, configured to receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE;

a determining unit, configured to determine a tunnel endpoint identifier (TEID) of the to-be-handed-over UE according to the handover notification;

an obtaining unit, configured to obtain context of the to-be-handed-over UE according to the TEID of the to-be-handed-over UE, where the context includes information about a source application that is providing a service to the to-be-handed-over UE; and a first sending unit, configured to send the context to the target MEC platform.

With reference to the fourth aspect, in a first possible embodiment of the fourth aspect, when the handover notification device is the source access network device, the handover notification includes the TEID of the to-be-handed-over UE and an identifier of a target access network device of the to-be-handed-over UE; and the first sending unit is further configured to:

determine a target MEC platform corresponding to the target access network device according to the identifier of the target access network device and a preset correspondence between a target access network device and an MEC platform; and send the context to the target MEC platform.

With reference to the fourth aspect, in a second possible embodiment of the fourth aspect, when the handover notification device is the target MEC platform of the to-be-handed-over UE, the handover notification includes an identifier of the to-be-handed-over UE; and the determining unit is further configured to:

send a request message to the source access network device, where the request message is used to obtain the TEID of the to-be-handed-over UE, and the request message includes the identifier of the to-be-handed-over UE; and receive a first response message sent by the source access network device, where the first response message carries the TEID of the to-be-handed-over UE.

With reference to any one of the fourth aspect, the first possible embodiment of the fourth aspect, or the second possible embodiment of the fourth aspect, in a third possible embodiment of the fourth aspect, the context further includes a routing rule for the to-be-handed-over UE, and the routing rule for the to-be-handed-over UE is used to indicate a rule by which the target MEC platform processes application data of the to-be-handed-over UE.

With reference to the first possible embodiment of the fourth aspect, in a fourth possible embodiment of the fourth aspect, the apparatus further includes:

a second receiving unit, configured to receive a second response message sent by the target MEC platform, where the second response message is used to instruct the target MEC platform to complete update of a routing rule; and a second sending unit, configured to send a handover response to the source access network device according to the second response message, where the handover response is used to instruct the source MEC platform to complete a platform handover for the to-be-handed-over UE.

With reference to any one of the fourth aspect, or the first to the fourth possible embodiments of the fourth aspect, in a fifth possible embodiment of the fourth aspect, the apparatus further includes:

a third receiving unit, configured to receive a resource release message sent by the target MEC platform, where the resource release message includes the identifier of the to-be-handed-over UE; and a release unit, configured to release a resource of the to-be-handed-over UE according to the resource release message.

According to a fifth aspect, a mobile edge computing (MEC) platform handover apparatus is provided. The apparatus is located in a handover notification device, and the handover notification device is a source access network device of to-be-handed-over user equipment (UE) or a target MEC platform of the to-be-handed-over UE. The apparatus includes:

a generation unit, configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE; and a first sending unit, configured to send the handover notification to the source MEC platform.

With reference to the fifth aspect, in a first possible embodiment of the fifth aspect, when the handover notification device is the source access network device of the to-be-handed-over UE, the generation unit is further configured to:

receive a measurement report sent by the to-be-handed-over UE;

determine, according to the measurement report, that the to-be-handed-over UE needs to be handed over between the access network devices; and generate the handover notification, where the handover notification includes a tunnel endpoint identifier (TEID) of the to-be-handed-over UE and an identifier of a target access network device of the to-be-handed-over UE.

With reference to the fifth aspect, in a second possible embodiment of the fifth aspect, when the handover notification device is the target MEC platform of the to-be-handed-over UE, the generation unit is further configured to:

receive a handover instruction sent by a target access network device of the to-be-handed-over UE, where the handover instruction includes an identifier of the to-be-handed-over UE and an identifier of the source access network device of the to-be-handed-over UE, and the handover instruction is used to indicate that the to-be-handed-over UE needs to be handed over between the access network devices; and generate the handover notification according to the handover instruction, where the handover notification includes the identifier of the to-be-handed-over UE; and the first sending unit is further configured to:

determine a source MEC platform corresponding to the source access network device according to the identifier of the source access network device and a preset correspondence between a source access network device and an MEC platform; and send the handover notification to the source MEC platform.

With reference to the first possible embodiment of the fifth aspect, in a third possible embodiment of the fifth aspect, the apparatus further includes:

a receiving unit, configured to receive a handover response sent by the source MEC platform, where the handover response is used to instruct the source MEC platform to complete a platform handover for the to-be-handed-over UE; and a second sending unit, configured to send a handover instruction to the to-be-handed-over UE according to the handover response, where the handover instruction is used to instruct the to-be-handed-over UE to be handed over to the target access network device.

According to a sixth aspect, a mobile edge computing (MEC) platform handover apparatus is provided. The apparatus is located on a target MEC platform of to-be-handed-over user equipment (UE). The apparatus includes:

a receiving unit, configured to receive context sent by a source MEC platform, where the context includes information about a source application that is providing a service to the to-be-handed-over UE; and an obtaining unit, configured to obtain, according to the information about the source application, application data of the to-be-handed-over UE from an application deployed on the target MEC platform.

With reference to the sixth aspect, in a first possible embodiment of the sixth aspect, the information about the source application includes an identifier of the source application, a control plane (CP) Internet Protocol (IP) address of the source application, and an IP of the to-be-handed-over UE.

With reference to the first possible embodiment of the sixth aspect, in a second possible embodiment of the sixth aspect, the obtaining unit is further configured to:

obtain, from the target MEC platform, a target application corresponding to the identifier of the source application;

send a notification message to the target application, where the notification message includes the CP IP of the source application and the IP of the to-be-handed-over UE, and the notification message is used to instruct the target application to obtain the application data of the to-be-handed-over UE; and receive the application data of the to-be-handed-over UE that is sent by the target application, where the application data of the to-be-handed-over UE is obtained by the target application from the source application according to the CP IP of the source application and the IP of the to-be-handed-over UE.

With reference to any one of the sixth aspect, or the first or the second possible embodiment of the sixth aspect, in a third possible embodiment of the sixth aspect, the context further includes a routing rule for the to-be-handed-over UE, and the routing rule for the to-be-handed-over UE is used to indicate a rule by which the target MEC platform processes the application data of the to-be-handed-over UE; and the apparatus further includes:

an update unit, configured to update, according to the routing rule for the to-be-handed-over UE, a routing rule stored on the target MEC platform.

With reference to the third possible embodiment of the sixth aspect, in a fourth possible embodiment of the sixth aspect, the apparatus further includes:

a processing unit, configured to perform buffering processing on the application data of the to-be-handed-over UE according to the routing rule for the to-be-handed-over UE; and a first sending unit, configured to send the application data of the to-be-handed-over UE that undergoes the buffering processing to the to-be-handed-over UE.

With reference to any one of the sixth aspect, or the first to the fourth possible embodiments of the sixth aspect, in a fifth possible embodiment of the sixth aspect, the apparatus further includes:

a second sending unit, configured to send a resource release message to the source MEC platform, where the resource release message includes an identifier of the to-be-handed-over UE, and is used to instruct the source MEC platform to release a resource of the to-be-handed-over UE.

According to a seventh aspect, a mobile edge computing (MEC) platform handover apparatus is provided. The apparatus is located on a source MEC platform of to-be-handed-over user equipment (UE). The apparatus includes a processor, a memory, a network interface, and a bus, where the bus is configured to connect the processor, the memory, and the network interface, and the processor is configured to execute a program stored in the memory;

the network interface is configured to receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE;

the processor is configured to determine a tunnel endpoint identifier (TEID) of the to-be-handed-over UE according to the handover notification;

the processor is configured to obtain context of the to-be-handed-over UE according to the TEID of the to-be-handed-over UE, where the context includes information about a source application that is providing a service to the to-be-handed-over UE; and the network interface is further configured to send the context to the target MEC platform.

With reference to the seventh aspect, in a first possible embodiment of the seventh aspect, when the handover notification device is the source access network device, the handover notification includes the TEID of the to-be-handed-over UE and an identifier of a target access network device of the to-be-handed-over UE; and the network interface is further configured to:

determine a target MEC platform corresponding to the target access network device according to the identifier of the target access network device and a preset correspondence between a target access network device and an MEC platform; and send the context to the target MEC platform.

With reference to the seventh aspect, in a second possible embodiment of the seventh aspect, when the handover notification device is the target MEC platform of the to-be-handed-over UE, the handover notification includes an identifier of the to-be-handed-over UE; and the network interface is further configured to:

send a request message to the source access network device, where the request message is used to obtain the TEID of the to-be-handed-over UE, and the request message includes the identifier of the to-be-handed-over UE; and receive a first response message sent by the source access network device, where the first response message carries the TEID of the to-be-handed-over UE.

With reference to any one of the seventh aspect, the first possible embodiment of the seventh aspect, or the second possible embodiment of the seventh aspect, in a third possible embodiment of the seventh aspect, the context further includes a routing rule for the to-be-handed-over UE, and the routing rule for the to-be-handed-over UE is used to indicate a rule by which the target MEC platform processes application data of the to-be-handed-over UE.

With reference to the first possible embodiment of the seventh aspect, in a fourth possible embodiment of the seventh aspect, the network interface is further configured to:

receive a second response message sent by the target MEC platform, where the second response message is used to instruct the target MEC platform to complete update of a routing rule; and send a handover response to the source access network device according to the second response message, where the handover response is used to instruct the source MEC platform to complete a platform handover for the to-be-handed-over UE.

With reference to any one of the seventh aspect, or the first to the fourth possible embodiments of the seventh aspect, in a fifth possible embodiment of the seventh aspect, the network interface is further configured to receive a resource release message sent by the target MEC platform, where the resource release message includes the identifier of the to-be-handed-over UE; and the processor is further configured to release a resource of the to-be-handed-over UE according to the resource release message.

According to an eighth aspect, a mobile edge computing (MEC) platform handover apparatus is provided. The apparatus is located in a handover notification device, and the handover notification device is a source access network device of to-be-handed-over user equipment (UE) or a target MEC platform of the to-be-handed-over UE. When the handover notification device is the source access network device, the apparatus includes a transmitter, a receiver, and a processor, where the processor is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE; and the transmitter is configured to send the handover notification to the source MEC platform.

When the handover notification device is the target MEC platform, the apparatus includes a processor, a memory, a network interface, and a bus, where the bus is configured to connect the processor, the memory, and the network interface, and the processor is configured to execute a program stored in the memory;

the processor is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE; and the network interface is configured to send the handover notification to the source MEC platform.

With reference to the eighth aspect, in a first possible embodiment of the eighth aspect, when the handover notification device is the source access network device of the to-be-handed-over UE, the receiver is further configured to:

receive a measurement report sent by the to-be-handed-over UE; and the processor is further configured to:

determine, according to the measurement report, that the to-be-handed-over UE needs to be handed over between the access network devices; and generate the handover notification, where the handover notification includes a tunnel endpoint identifier (TEID) of the to-be-handed-over UE and an identifier of a target access network device of the to-be-handed-over UE.

With reference to the eighth aspect, in a second possible embodiment of the eighth aspect, when the handover notification device is the target MEC platform of the to-be-handed-over UE, the network interface is further configured to:

receive a handover instruction sent by a target access network device of the to-be-handed-over UE, where the handover instruction includes an identifier of the to-be-handed-over UE and an identifier of the source access network device of the to-be-handed-over UE, and the handover instruction is used to indicate that the to-be-handed-over UE needs to be handed over between the access network devices;

the processor is further configured to: generate the handover notification according to the handover instruction, where the handover notification includes the identifier of the to-be-handed-over UE; and the network interface is further configured to:

determine a source MEC platform corresponding to the source access network device according to identifier of the source access network device and a preset correspondence between a source access network device and an MEC platform; and send the handover notification to the source MEC platform.

With reference to the first possible embodiment of the eighth aspect, in a third possible embodiment of the eighth aspect, the receiver is further configured to:

receive a handover response sent by the source MEC platform, where the handover response is used to instruct the source MEC platform to complete a platform handover for the to-be-handed-over UE; and send a handover instruction to the to-be-handed-over UE according to the handover response, where the handover instruction is used to instruct the to-be-handed-over UE to be handed over to the target access network device.

According to a ninth aspect, a mobile edge computing (MEC) platform handover apparatus is provided. The apparatus is located on a target MEC platform of to-be-handed-over user equipment (UE). The apparatus includes a processor, a memory, a network interface, and a bus, where the bus is configured to connect the processor, the memory, and the network interface, and the processor is configured to execute a program stored in the memory;

the network interface is configured to receive context sent by a source MEC platform, where the context includes information about a source application that is providing a service to the to-be-handed-over UE; and the processor is configured to obtain, according to the information about the source application, application data of the to-be-handed-over UE from an application deployed on the target MEC platform.

With reference to the ninth aspect, in a first possible embodiment of the ninth aspect, the information about the source application includes an identifier of the source application, a control plane (CP) Internet Protocol (IP) address of the source application, and an IP of the to-be-handed-over UE.

With reference to the first possible embodiment of the ninth aspect, in a second possible embodiment of the ninth aspect, the processor is further configured to:

obtain, from the target MEC platform, a target application corresponding to the identifier of the source application; and the network interface is further configured to:

send a notification message to the target application, where the notification message includes the CP IP of the source application and the IP of the to-be-handed-over UE, and the notification message is used to instruct the target application to obtain the application data of the to-be-handed-over UE; and receive the application data of the to-be-handed-over UE that is sent by the target application, where the application data of the to-be-handed-over UE is obtained by the target application from the source application according to the CP IP of the source application and the IP of the to-be-handed-over UE.

With reference to any one of the ninth aspect, or the first or the second possible embodiment of the ninth aspect, in a third possible embodiment of the ninth aspect, the context further includes a routing rule for the to-be-handed-over UE, and the routing rule for the to-be-handed-over UE is used to indicate a rule by which the target MEC platform processes the application data of the to-be-handed-over UE; and the processor is further configured to:

update, according to the routing rule for the to-be-handed-over UE, a routing rule stored on the target MEC platform.

With reference to the third possible embodiment of the ninth aspect, in a fourth possible embodiment of the ninth aspect, the context of the to-be-handed-over UE further includes a routing rule for the to-be-handed-over UE, and the processor is further configured to:

perform buffering processing on the application data of the to-be-handed-over UE according to the routing rule for the to-be-handed-over UE; and the network interface is further configured to send the application data of the to-be-handed-over UE that undergoes the buffering processing to the to-be-handed-over UE.

With reference to any one of the ninth aspect, or the first to the fourth possible embodiments of the ninth aspect, in a fifth possible embodiment of the ninth aspect, the network interface is further configured to:

send a resource release message to the source MEC platform, where the resource release message includes an identifier of the to-be-handed-over UE, and is used to instruct the source MEC platform to release a resource of the to-be-handed-over UE.

According to a tenth aspect, a mobile edge computing (MEC) platform handover system is provided. The system includes to-be-handed-over user equipment (UE), a source access network device of the to-be-handed-over UE, a target access network device of the to-be-handed-over UE, a source MEC platform of the to-be-handed-over UE, and a target MEC platform of the to-be-handed-over UE, and the source access network device or the target MEC platform is a handover notification device;

the source MEC platform includes the MEC platform handover apparatus according to any embodiment of the fourth aspect;

the target MEC platform includes the MEC platform handover apparatus according to any embodiment of the sixth aspect; and the handover notification device includes the MEC platform handover apparatus according to any embodiment of the fifth aspect.

According to an eleventh aspect, a mobile edge computing (MEC) platform handover system is provided. The system includes to-be-handed-over user equipment (UE), a source access network device of the to-be-handed-over UE, a target access network device of the to-be-handed-over UE, a source MEC platform of the to-be-handed-over UE, and a target MEC platform of the to-be-handed-over UE, and the source access network device or the target MEC platform is a handover notification device;

the source MEC platform includes the MEC platform handover apparatus according to any embodiment of the seventh aspect;

the target MEC platform includes the MEC platform handover apparatus according to any embodiment of the ninth aspect; and the handover notification device includes the MEC platform handover apparatus according to any embodiment of the eighth aspect.

The present invention further provides a mobile edge computing (MEC) platform handover method. The method is performed by a source access network device, and the method includes:

receiving a request message sent by a source MEC platform, where the request message is used to obtain a TEID of to-be-handed-over UE, and the request message includes an identifier of the to-be-handed-over UE;

finding the TEID of the to-be-handed-over UE from a prestored correspondence between an identifier and a TEID according to the identifier of the to-be-handed-over UE; and sending a first response message to the source MEC platform, where the first response message carries the TEID of the to-be-handed-over UE.

The present invention further provides a mobile edge computing (MEC) platform handover method. The method is performed by a target access network device, and the method includes:

receiving a handover request sent by a source access network device; and sending a handover instruction to a target MEC platform according to the handover request, where the handover instruction includes an identifier of to-be-handed-over UE and an identifier of the source access network device, and the handover instruction is used to instruct to the to-be-handed-over UE to be handed over between access network devices.

The present invention further provides an MEC platform handover apparatus. The apparatus is located in a source access network device, and the apparatus includes:

a receiving unit, configured to receive a request message sent by a source MEC platform, where the request message is used to obtain a TEID of to-be-handed-over UE, and the request message includes an identifier of the to-be-handed-over UE;

a query unit, configured to find the TEID of the to-be-handed-over UE from a prestored correspondence between an identifier and a TEID according to the identifier of the to-be-handed-over UE; and a sending unit, configured to send a first response message to the source MEC platform, where the first response message carries the TEID of the to-be-handed-over UE.

The present invention further provides an MEC platform handover apparatus. The apparatus is located in a target access network device, and the apparatus includes:

a receiving unit, configured to receive a handover request sent by a source access network device; and a sending unit, configured to send a handover instruction to a target MEC platform according to the handover request, where the handover instruction includes an identifier of to-be-handed-over UE and an identifier of the source access network device, and the handover instruction is used to instruct to the to-be-handed-over UE to be handed over between access network devices.

The present invention further provides an MEC platform handover apparatus. The apparatus is located in a source access network device, and the apparatus includes a transmitter, a receiver, and a processor, where the receiver is configured to receive a request message sent by a source MEC platform, where the request message is used to obtain a TEID of to-be-handed-over UE, and the request message includes an identifier of the to-be-handed-over UE;

the processor is configured to find the TEID of the to-be-handed-over UE from a prestored correspondence between an identifier and a TEID according to the identifier of the to-be-handed-over UE; and the transmitter is configured to send a first response message to the source MEC platform, where the first response message carries the TEID of the to-be-handed-over UE.

The present invention further provides an MEC platform handover apparatus. The apparatus is located in a target access network device, and the apparatus includes a transmitter, a receiver, and a processor, where the receiver is configured to receive a handover request sent by a source access network device; and the transmitter is configured to send a handover instruction to a target MEC platform according to the handover request, where the handover instruction includes an identifier of to-be-handed-over UE and an identifier of the source access network device, and the handover instruction is used to instruct to the to-be-handed-over UE to be handed over between access network devices.

Beneficial effects of the technical solutions provided in the present invention are as follows.

According to the MEC platform handover method, apparatus, and system provided in the embodiments of the present invention, after determining that the to-be-handed-over UE needs to be handed over between the access network devices, the source access network device may send the handover notification to the source MEC platform. The source MEC platform may determine the tunnel endpoint identifier (TEID) of the to-be-handed-over UE according to the handover notification, and obtain the context of the to-be-handed-over UE. The context of the to-be-handed-over UE includes the information about the source application that is providing a service to the to-be-handed-over UE. Then, the source MEC platform may send the context to the target MEC platform, so that the target MEC platform obtains the application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

It should be understood that the foregoing general description and the following detailed description are merely examples and explanations, and cannot constitute limitations on the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1-2 is an architecture diagram of an MEC server according to an embodiment of the present invention;

FIG. 1-3 is a schematic diagram of a platform handover system that is related to an MEC platform handover method according to an embodiment of the present invention;

FIG. 2 is a flowchart of an MEC platform handover method according to an embodiment of the present invention;

FIG. 3 is a flowchart of another MEC platform handover method according to an embodiment of the present invention;

FIG. 5-1 is a flowchart of still another MEC platform handover method according to an embodiment of the present invention;

FIG. 5-2 is a flowchart of a method for generating a handover notification by a source access network device according to an embodiment of the present invention;

FIG. 7-1 is a schematic diagram of an MEC platform handover apparatus according to an embodiment of the present invention;

FIG. 7-2 is a schematic diagram of another MEC platform handover apparatus according to an embodiment of the present invention;

FIG. 8-1 is a schematic diagram of still another MEC platform handover apparatus according to an embodiment of the present invention;

FIG. 8-2 is a schematic diagram of yet another MEC platform handover apparatus according to an embodiment of the present invention;

FIG. 9-1 is a schematic diagram of yet another MEC platform handover apparatus according to an embodiment of the present invention;

FIG. 9-2 is a schematic diagram of yet another MEC platform handover apparatus according to an embodiment of the present invention;

FIG. 11-1 is a schematic diagram of yet another MEC platform handover apparatus according to an embodiment of the present invention;

FIG. 11-2 is a schematic diagram of yet another MEC platform handover apparatus according to an embodiment of the present invention.

The foregoing accompanying drawings show specific embodiments of the present invention, and more detailed descriptions are provided in the following. The accompanying drawings and text descriptions are not intended to limit the scope of the idea of the present invention in any manner, but are intended to describe the concept of the present invention to a person skilled in the art with reference to particular embodiments.

DESCRIPTION OF EMBODIMENTS

To make the objectives, technical solutions, and advantages of the present invention clearer, the following further describes the embodiments of the present invention in detail with reference to the accompanying drawings.

Figure 1:
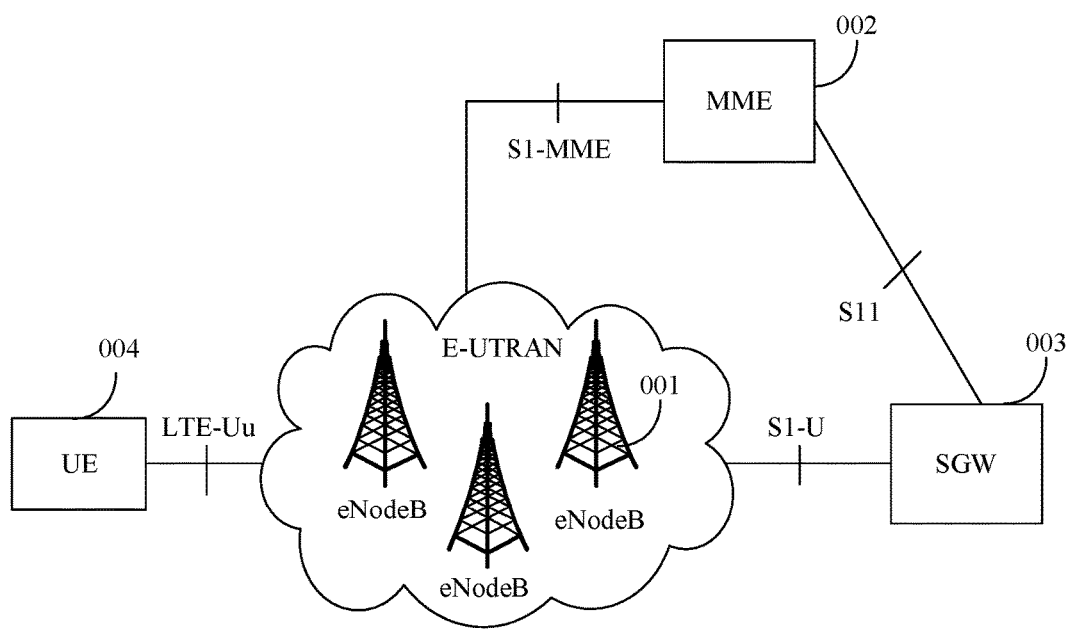
FIG. 1-1 is a schematic deployment diagram of an MEC server in an LTE system according to an embodiment of the present invention.

A mobile edge computing (MEC) server is usually deployed on a user plane interface between an access network device and a core network access gateway in a mobile communications network. The mobile communications network may be systems of various standards, for example, may be a long term evolution (LTE) system, a time division-synchronous code division multiple access (TD-SCDMA) system, a wideband code division multiple access (WCDMA) system, or the like. In the LTE system, the access network device may be an evolved NodeB (eNodeB), and the core network access gateway may be a serving gateway (SGW). In the TD-SCDMA or WCDMA system, the access network device may be a radio network controller (RNC), and the core network access gateway may be a serving GPRS support node (SGSN). For example, FIG. 1-1 is a schematic deployment diagram of an MEC server in an LTE system according to an embodiment of the present invention. The LTE system includes an evolved universal terrestrial radio access network (E-UTRAN) and an evolved packet core (EPC). The E-UTRAN is a network including multiple eNodeBs 001. The EPC includes a mobility management entity (MME) 002 responsible for signaling processing and an SGW 003 for data processing. The eNodeBs 001 in the E-UTRAN are connected to the SGW 003 in the EPC by using a user plane interface, are connected to the MME 002 in the EPC by using a control plane interface, and are connected to UE 004 by using an LTE-Uu interface. The MME 002 in the EPC is connected to the SGW 003 by using an S11 interface. The user plane interface is also referred to as S1-U, and the control plane interface is also referred to as S1-MME. As shown in FIG. 1-1, the MEC server is usually deployed on the user plane interface S1-U between the eNodeBs and the SGW. Because the MEC server is deployed on a radio access network side near the UE, the MEC server can provide a low-latency, fast-access, and high-bandwidth service to the UE.

Figures 1, 2:
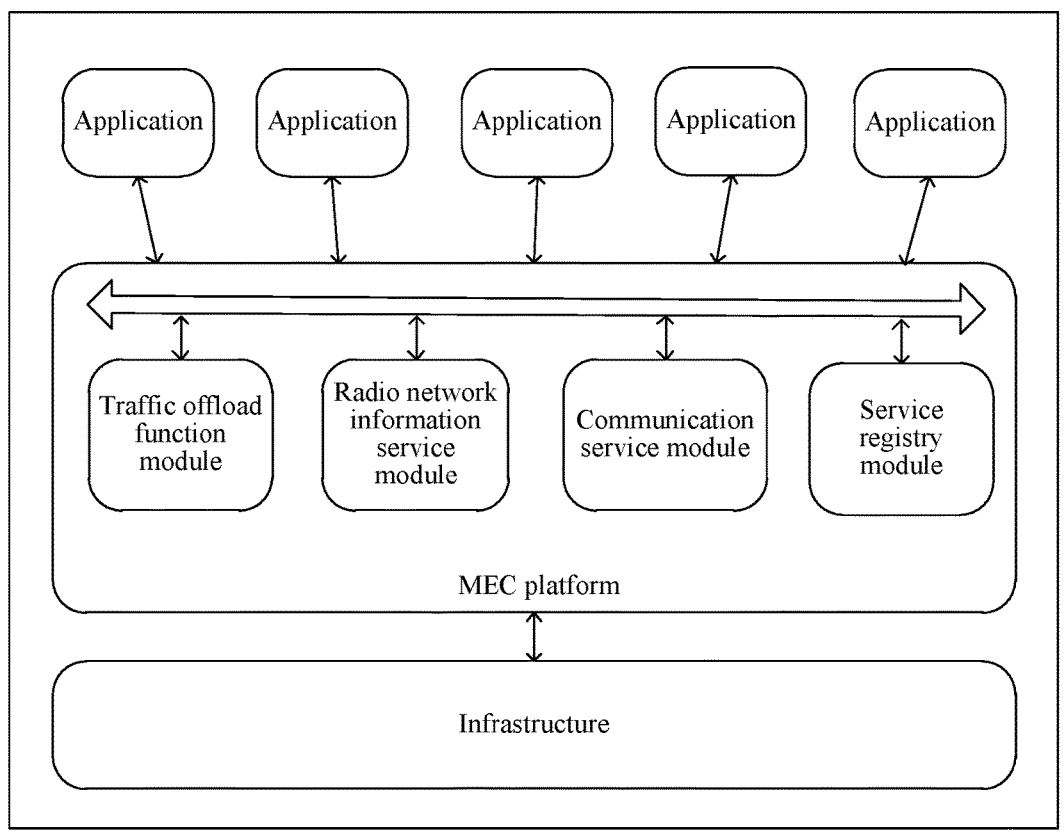

FIG. 1-2 is an architecture diagram of an MEC server according to an embodiment of the present invention. As shown in FIG. 1-2, in addition to underlying infrastructures, the MEC server includes an MEC platform and multiple applications deployed on the MEC platform. The multiple applications separately run on application virtual machines. The MEC platform is a core of the MEC server, and may include a traffic offload function (TOF) module, a radio network information service (RNIS) module, a communication service module, a service registry module, and the like, so as to manage the multiple applications, and provide services such as communication and service registry to the multiple applications. User equipment (UE) can obtain related application data from the MEC platform in the MEC server by using a radio access network (RAN). For example, it is assumed that a video-type application is deployed on the MEC platform in the MEC server. In the video-type application, video data provided by a service provider may be buffered. The MEC platform may manage the video-type application, and forward the video data buffered in the video-type application to UE that accesses a communications network. For example, in the LTE network shown in FIG. 1-1, the UE may obtain, by using the E-UTRAN and from an MEC platform in a corresponding MEC server, video data provided by a video-type application.

Figures 1, 2, 3:
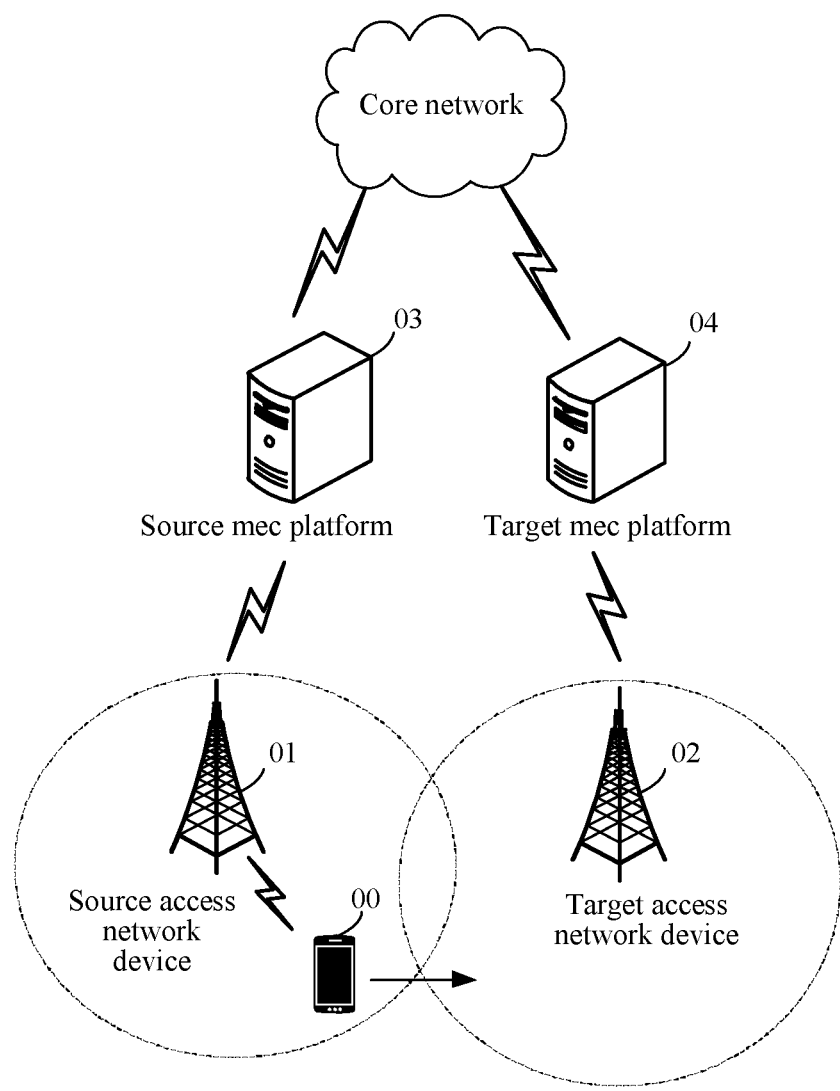
Figure 2:
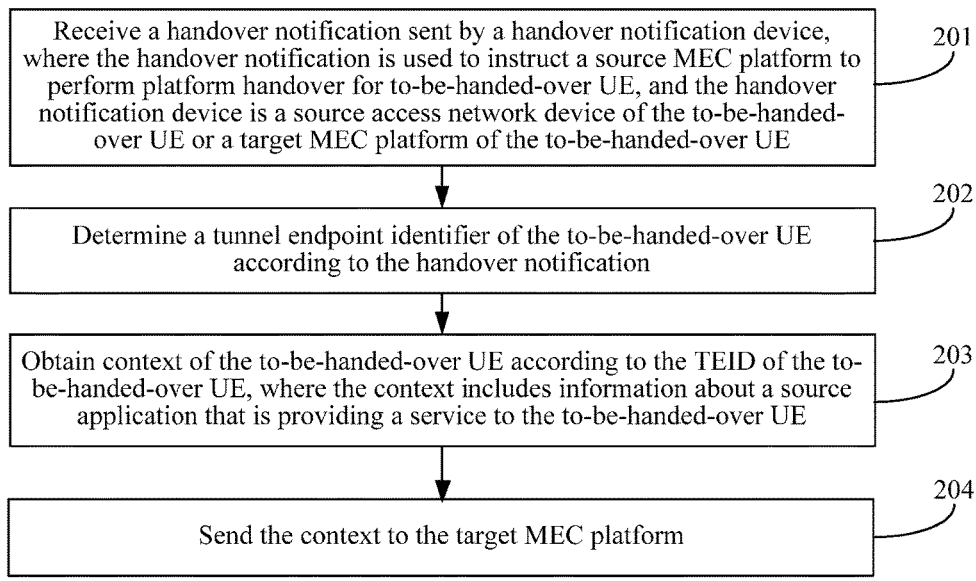
Figure 3:
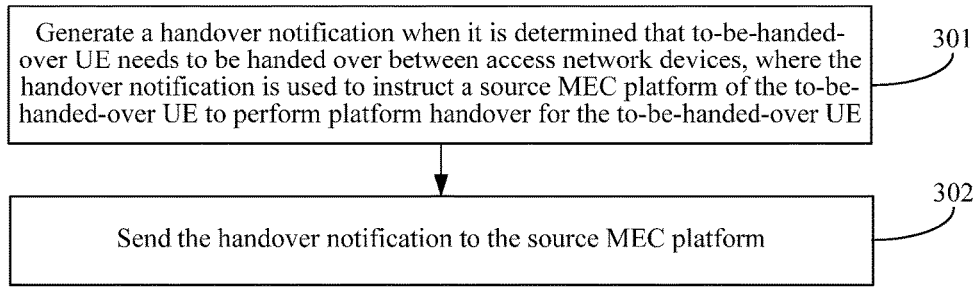

FIG. 1-3 is a schematic diagram of a platform handover system that is related to an MEC platform handover method according to an embodiment of the present invention. As shown in FIG. 1-3, the platform handover system includes UE 00, at least two access network devices, and MEC platforms respectively corresponding to the at least two access network devices. For example, the at least two access network devices may be a source access network device 01 and a target access network device 02. An MEC platform corresponding to the source access network device 01 is a source MEC platform 03, and an MEC platform corresponding to the target access network device 02 is a target MEC platform 04. If an access network device that is currently accessed by the UE 00 is the source access network device 01, a video-type application A is deployed on the source MEC platform 03 corresponding to the source access network device 01, and the source MEC platform 03 is providing, to the UE, video data that is of an online video and that is buffered in the video-type application A, during movement of the UE 00, when the UE 00 needs to be handed over from a cell covered by the source access network device 01 to a cell covered by the target access network device 02, an MEC platform that provides the video data to the UE 00 also needs to be changed from the source MEC platform 03 to the target MEC platform 04. That is, after the UE is handed over to the target access network device, a video-type application B deployed on the target MEC platform 04 continues to provide video data to the UE 00. The video-type application A and application B may buffer video data provided by a same service provider. The video-type application A deployed on the source MEC platform 03 may be a source application, and the video-type application B deployed on the target MEC platform 04 may be a target application. Therefore, it can be ensured that the UE 00 can obtain continuous application data from the MEC platforms when the UE 00 is handed over between the access network devices.

In an LTE system, when UE is handed over from a source access network device to a target access network device, two handover manners may be used for embodiment: an X2 interface-based handover and an S1 interface-based handover. In an X2 interface-based handover process, both data and signaling are forwarded from the source access network device to the target access network device by using an X2 interface between the access network devices. In an S1 interface-based handover process, signaling is forwarded by using an S1 interface between an access network device and an MME. If no X2 interface exists between the source access network device and the target access network device, data is indirectly forwarded by using an S1-U interface. If an X2 interface exists between the source access network device and the target access network device, data can be directly forwarded by using the X2 interface. According to the MEC platform handover method, when the UE is being handed over form the source access network device to the target access network device, the source access network device or the target access network device instructs an MEC platform to perform MEC platform handover. Then, a handover procedure between the access network devices and a handover procedure between MEC platforms may be performed in parallel.

FIG. 2 is a flowchart of an MEC platform handover method according to an embodiment of the present invention. The method may be performed by the source MEC platform of the to-be-handed-over UE shown in FIG. 1-3. As shown in FIG. 2, the method includes the following steps:

Step 201: Receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE.

Step 202: Determine a tunnel endpoint identifier (TEID) of the to-be-handed-over UE according to the handover notification.

Step 203: Obtain context of the to-be-handed-over UE according to the TEID of the to-be-handed-over UE, where the context includes information about a source application that is providing a service to the to-be-handed-over UE.

Step 204: Send the context to the target MEC platform.

In conclusion, according to the MEC platform handover method provided in this embodiment of the present invention, after receiving the handover notification sent by the source access network device or the target MEC platform, the source MEC platform may determine the tunnel endpoint identifier (TEID) of the to-be-handed-over UE according to the handover notification, and obtain the context of the to-be-handed-over UE. The context includes the information about the source application that is providing a service to the to-be-handed-over UE. Then, the source MEC platform may send the context to the target MEC platform, so that the target MEC platform obtains application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

FIG. 3 is a flowchart of another MEC platform handover method according to an embodiment of the present invention. The method may be performed by the source access network device of the to-be-handed-over UE or the target MEC platform of the to-be-handed-over UE shown in FIG. 1-3. As shown in FIG. 3, the method includes the following steps:

Step 301: Generate a handover notification when it is determined that the to-be-handed-over UE needs to be handed over between access network devices, where the handover notification is used to instruct a source MEC platform of the to-be-handed-over UE to perform platform handover for the to-be-handed-over UE.

Step 302: Send the handover notification to the source MEC platform.

In conclusion, according to the MEC platform handover method provided in this embodiment of the present invention, when determining that the to-be-handed-over UE needs to be handed over between the access network devices, the source access network device or the target MEC platform may generate the handover notification, and send the handover notification to the source MEC platform. The handover notification is used to instruct the source MEC platform of the to-be-handed-over UE to perform platform handover for the to-be-handed-over UE, so that the source MEC platform sends context of the to-be-handed-over UE to the target MEC platform. The target MEC platform may obtain application data of the to-be-handed-over UE according to information about a source application in the context. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figure 4:
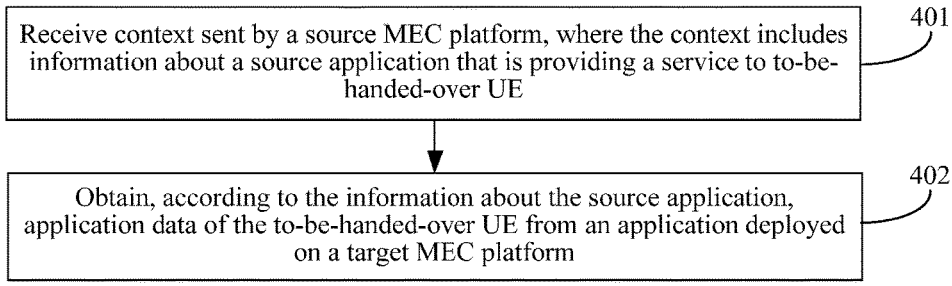
FIG. 4 is a flowchart of still another MEC platform handover method according to an embodiment of the present invention.

FIG. 4 is a flowchart of still another MEC platform handover method according to an embodiment of the present invention. The method may be performed by the target MEC platform of the to-be-handed-over UE shown in FIG. 1-3. As shown in FIG. 4, the method includes the following steps.

Step 401: Receive context sent by a source MEC platform, where the context includes information about a source application that is providing a service to the to-be-handed-over UE.

The context is obtained by the source MEC platform after receiving a handover notification sent by a communications device and after determining a TEID of the to-be-handed-over UE according to the handover notification. The communications device is a source base station or the target MEC platform.

Step 402: Obtain, according to the information about the source application, application data of the to-be-handed-over UE from an application deployed on the target MEC platform.

In conclusion, according to the MEC platform handover method provided in this embodiment of the present invention, after receiving the context sent by the source MEC platform, the target MEC platform may obtain, according to the information about the source application that is providing a service to the to-be-handed-over UE, the application data of the to-be-handed-over UE from the application deployed on the target MEC platform, where the information is included in the context of the to-be-handed-over UE, and continue to provide a service to the to-be-handed-over UE according to the application data, thereby ensuring continuity of obtaining application data by the UE from an MEC platform.

Figures 1, 5:
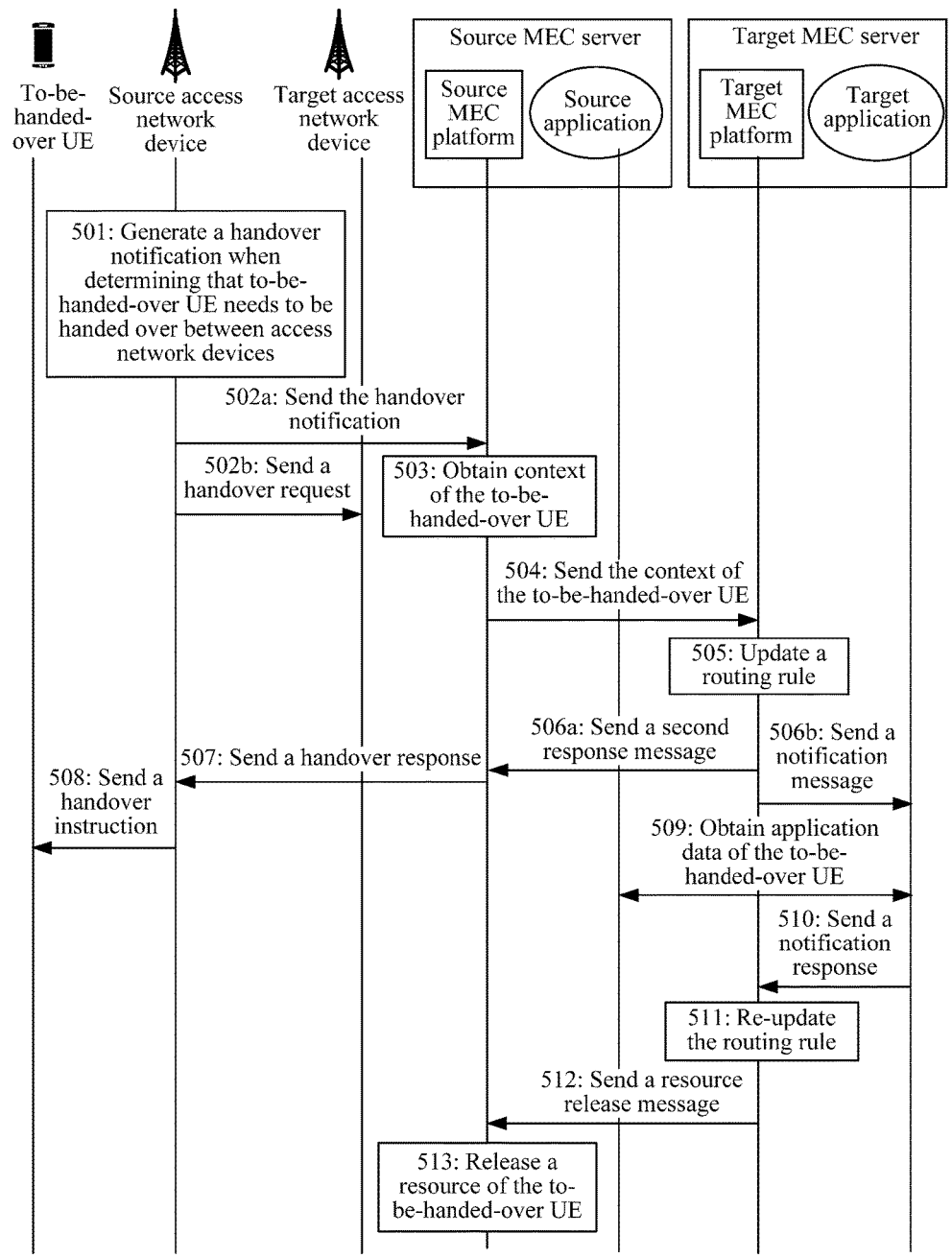
Figures 2, 5:
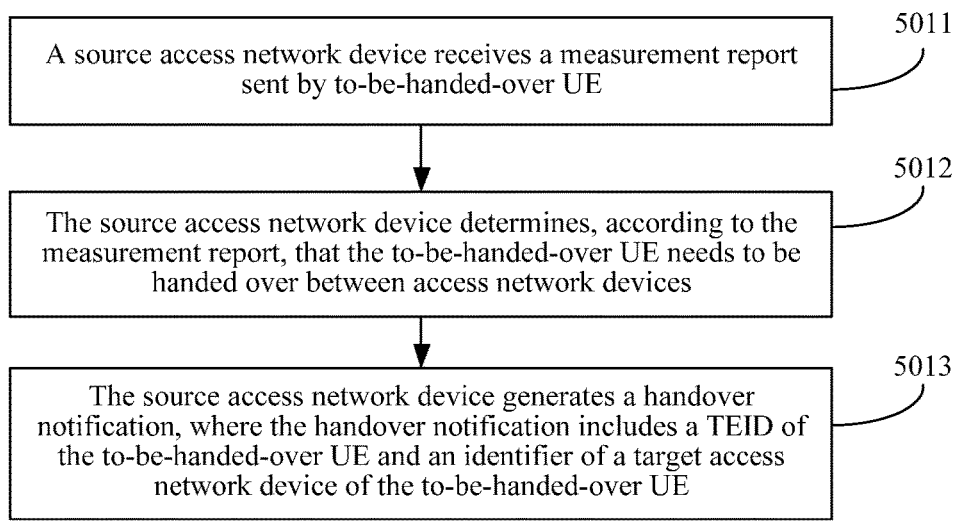

In the embodiments of the present invention, when the UE needs to be handed over from the source access network device to the target access network device, the source access network device or the target MEC platform sends the handover notification to the source MEC platform, to instruct the source MEC platform to perform platform handover. Then, a handover procedure between the access network devices and a handover procedure between the MEC platforms may be performed in parallel. According to an aspect, in an embodiment of the present invention, an MEC platform handover method provided in this embodiment of the present invention is described in detail by using an example in which a source access network device sends a handover notification to a source MEC platform in an X2 interface-based handover procedure in an LTE system. The method may be applied to the system shown in FIG. 1-3. As shown in FIG. 5-1, the method includes the following steps.

Step 501: A source access network device generates a handover notification when determining that to-be-handed-over UE needs to be handed over between access network devices.

In this embodiment of the present invention, when determining that the to-be-handed-over UE accessing the access network device needs to be handed over between access network devices, the source access network device may generate the handover notification that is used to instruct a source MEC platform of the to-be-handed-over UE to perform platform handover for the to-be-handed-over UE. The handover notification includes a tunnel endpoint identifier (TEID) of the to-be-handed-over UE and an identifier of a target access network device that needs to be accessed by the to-be-handed-over UE after the handover. The TEID is allocated by the source access network device to UE that accesses a serving cell of the access network device, and is used to uniquely identify a communications tunnel used by each UE.

FIG. 5-2 is a flowchart of a method for generating the handover notification by the source access network device according to an embodiment of the present invention. As shown in FIG. 5-2, the method includes the following steps.

Step 5011: The source access network device receives a measurement report sent by the to-be-handed-over UE.

After accessing a cell (that is, the serving cell) covered by the source access network device, the to-be-handed-over UE may continually measure a signal quality of the serving cell and a cell adjacent to the serving cell (that is, a neighboring cell), and periodically send a neighboring cell measurement report to the source access network device, or when the signal quality of the neighboring cell is greater than that of the serving cell by a specific threshold and this case maintains for a period of time, send the neighboring cell measurement report to the source access network device.

Step 5012: The source access network device determines, according to the measurement report, that the to-be-handed-over UE needs to be handed over between the access network devices.

The source access network device may determine, according to the neighboring cell measurement report, whether the signal quality of the neighboring cell is greater than the signal quality of the serving cell. When the signal quality of the neighboring cell is greater than the signal quality of the serving cell, the source access network device can determine that the to-be-handed-over UE needs to be handed over between the access network devices.

Step 5013: The source access network device generates the handover notification, where the handover notification includes the TEID of the to-be-handed-over UE and the identifier of the target access network device of the to-be-handed-over UE.

After determining that the to-be-handed-over UE needs to be handed over between the access network devices, the source access network device may obtain the TEID of the to-be-handed-over UE and the identifier of the target access network device that needs to be accessed by the to-be-handed-over UE after the handover, and generate the handover notification according to the TEID of the to-be-handed-over UE and the identifier of the target access network device.

Step 502a: The source access network device sends the handover notification to a source MEC platform.

After determining that the to-be-handed-over UE needs to be handed over between the access network devices, the source access network device may send the handover notification including the TEID of the to-be-handed-over UE and the identifier of the target access network device to the source MEC platform corresponding to the source access network device, so as to instruct the source MEC platform to perform platform handover for the to-be-handed-over UE.

Step 502b: The source access network device sends a handover request to a target access network device.

In the X2 interface-based handover procedure, after determining that the to-be-handed-over UE needs to be handed over between the access network devices, the source access network device may send the handover request to the target access network device. In an S1 interface-based handover procedure, when determining that the to-be-handed-over UE needs to be handed over between the access network devices, the source access network device may send a handover request to a source MME.

During actual application, step 502a and step 502b may be performed at the same time, that is, after the source access network device determines that the to-be-handed-over UE needs to be handed over between the access network devices, the handover notification sent to the source MEC platform and the handover request sent to the target access network device may be sent in parallel.

Step 503: The source MEC platform obtains context of the to-be-handed-over UE.

After receiving the handover notification sent by the source access network device, the source MEC platform may obtain, from prestored context of UE, the context of the to-be-handed-over UE according to the TEID of the to-be-handed-over UE in the handover notification. The context of the to-be-handed-over UE includes information about a source application that is providing a service to the to-be-handed-over UE and a routing rule for the to-be-handed-over UE. The information about the source application includes an identifier of the source application and a control plane Internet Protocol (CP IP) address of the application.

The identifier of the application is used to identify an application in an MEC server. The CP IP is used for communication between applications in different MEC servers, that is, for synchronization of the application data of the to-be-handed-over UE. The routing rule for the to-be-handed-over UE is used to indicate a rule by which an MEC platform processes the application data of the to-be-handed-over UE. The routing rule may include an IP packet filter of the to-be-handed-over UE and an application list corresponding to the IP packet filter. The IP packet filter includes a source IP address, a destination IP address, a source port number, a destination port number, and a protocol number. The application list includes an application through which a data flow meeting the IP packet filter is to pass. The information about the source application may further include an IP of the to-be-handed-over UE, so that a target application may synchronize the application data of the to-be-handed-over UE from the source application according to the IP of the UE.

Step 504: The source MEC platform sends the context of the to-be-handed-over UE to a target MEC platform.

In this embodiment of the present invention, the source MEC platform may send the context of the to-be-handed-over UE to the target MEC platform by using a distributed gateway (DGW) tunnel.

Step 505: The target MEC platform updates, according to a routing rule for the to-be-handed-over UE, a routing rule stored on the target MEC platform.

After receiving the context of the to-be-handed-over UE sent by the source MEC platform, the target MEC platform may first update, according to the routing rule that is for the to-be-handed-over UE and that is in the context of the to-be-handed-over UE, the routing rule stored on the target MEC platform. If the target application has not obtained the application data of the to-be-handed-over UE from the source application when the target MEC platform receives uplink data of the to-be-handed-over UE, the target MEC platform may buffer the uplink data of the to-be-handed-over UE according to the updated routing rule.

Step 506a: The target MEC platform sends a second response message to the source MEC platform.

The second response message is used to instruct the target MEC platform to complete the update of the routing rule, so that the source MEC platform can send a handover response to the source access network device.

Step 506b: The target MEC platform sends a notification message to a target application corresponding to an identifier of a source application.

The context of the to-be-handed-over UE received by the target MEC platform includes the information about the source application that is providing a service to the to-be-handed-over UE. The information includes the identifier of the source application, the CP IP of the source application, and the IP of the to-be-handed-over UE. The target MEC platform may determine, according to the identifier of the source application, a target application that corresponds to the identifier in the target MEC platform, and send the notification message to the target application. The notification message includes the IP of the to-be-handed-over UE and the CP IP of the source application. In this way, the target application may send a data obtaining request to the source application according to the CP IP. The data obtaining request carries the IP of the to-be-handed-over UE. After receiving the data obtaining request, the source application may obtain the application data of the to-be-handed-over UE according to the IP of the to-be-handed-over UE, and send the application data of the to-be-handed-over UE to the target application, so that the target application synchronizes a status of the to-be-handed-over UE.

In this embodiment of the present invention, the response message in step 506a and the notification message in step 506b are sent by the target MEC platform in parallel. That is, after completing the update of the routing rule, the target MEC platform may send the notification message to the target application at the same time when sending the response message to the source MEC platform.

Step 507: The source MEC platform sends a handover response to the source access network device.

The handover response is used to instruct the source MEC platform to complete the handover to the target MEC platform. After receiving the response message sent by the target MEC platform, the source MEC platform can determine that the target MEC platform has completed the update of the routing rule for the to-be-handed-over UE, that is, the target MEC platform can receive and process the uplink data of the UE. Therefore, the source MEC platform may send the handover response to the source access network device.

Step 508: The source access network device sends a handover instruction to the to-be-handed-over UE according to the handover response.

After receiving the handover response, the source access network device can send the handover instruction to the to-be-handed-over UE. The handover instruction is used to instruct the to-be-handed-over UE to be handed over to the target access network device. Because a handover procedure between the MEC platforms and a handover procedure between the access network devices are performed in parallel, if the source access network device has received, before receiving the handover response sent by the source MEC platform, a handover response sent by the target access network device (in the X2 interface-based handover procedure) or a handover response sent by the source MME (in the S1 interface-based handover procedure), the source access network device may start a timer. If the handover response sent by the source MEC platform is not received within a time period preset on the timer, the source access network device performs an original handover procedure between the access network devices, that is, sends the handover instruction to the to-be-handed-over UE. Alternatively, if the handover response sent by the source MEC platform is received within a time period preset on the timer, the source access network device immediately sends the handover instruction to the to-be-handed-over UE.

Step 509: The target application obtains application data of the to-be-handed-over UE from the source application.

In step 506b, after receiving the notification message sent by the target MEC platform, the target application may send the data obtaining request to the source application according to the CP IP of the source application in the notification message. The data obtaining request carries the IP of the to-be-handed-over UE. After receiving the data obtaining request, the source application may obtain the application data of the to-be-handed-over UE according to the IP of the to-be-handed-over UE, and send the application data of the to-be-handed-over UE to the target application, so that the target MEC platform can provide continuous services to the to-be-handed-over UE by using the application data obtained by the target application.

Step 510: The target application sends a notification response to the target MEC platform.

After obtaining the application data of the to-be-handed-over UE, the target application can send the notification response to the target MEC platform. After receiving the notification response, the target MEC platform can determine that the target MEC platform can provide continuous services to the to-be-handed-over UE according to the application data obtained by the target application.

Before the target MEC platform receives the response sent by the target application, and after the to-be-handed-over UE receives the handover instruction sent by the source access network device, if the to-be-handed-over UE has accessed the target access network device and has sent uplink data to the target MEC platform by using the target access network device, the target MEC platform may buffer the uplink data of the to-be-handed-over UE according to the updated routing rule.

Step 511: The target MEC platform re-updates the routing rule.

After the target MEC platform receives the response sent by the target application, the target MEC platform can determine that the target application has obtained the application data of the to-be-handed-over UE. In this case, the target MEC platform may re-update the routing rule, and process the previously buffered uplink data of the to-be-handed-over UE and the synchronized application data of the UE in the target application according to the updated routing rule. Then, the target MEC platform may send the processed application data of the to-be-handed-over UE to the to-be-handed-over UE, thereby ensuring continuity of obtaining a service by the to-be-handed-over UE from an MEC platform.

It should be noted that during actual application, after receiving the context of the to-be-handed-over UE, as shown in step 505, the target MEC platform may first update the IP packet filter in the routing rule for the to-be-handed-over UE. That is, the target MEC platform may buffer the uplink data of the to-be-handed-over UE according to the IP packet filter. After receiving the response sent by the target application, the target MEC platform may update the IP packet filter in the routing rule for the to-be-handed-over UE again, and update the application list corresponding to the IP packet filter.

Step 512: The target MEC platform sends a resource release message to the source MEC platform.

The resource release message includes the identifier of the to-be-handed-over UE, and the identifier may be the TEID of the to-be-handed-over UE or the IP of the to-be-handed-over UE. The resource release message is used to instruct the source MEC platform to release a resource of the to-be-handed-over UE.

Step 513: The source MEC platform releases a resource of the to-be-handed-over UE according to the resource release message.

The resource release message includes the identifier of the to-be-handed-over UE, and the identifier may be the TEID of the to-be-handed-over UE or the IP of the to-be-handed-over UE. The source MEC platform may release the resource of the to-be-handed-over UE according to the identifier of the to-be-handed-over UE. In this way, the source MEC platform and the target MEC platform complete the platform handover for the to-be-handed-over UE.

In this embodiment of the present invention, it is assumed that before the UE is handed over from the source access network device to the target access network device, the source MEC platform corresponding to the source access network device is providing, to the UE, video data of an online video buffered in a video-type application A, and when the UE is being handed over between the access network devices, the online video in the UE has been played for 3 minutes and 56 seconds. In this case, when the UE is being handed over to the target access network device, the target MEC platform and the source MEC platform may perform the platform handover procedure provided in this embodiment of the present invention in parallel. After the platform handover, a video-type application B deployed on the target MEC platform may obtain application data of the UE from the application A. The application data may include a playing progress of the online video currently obtained by the UE. Therefore, the video-type application B may continue to provide, by using the target MEC platform, video data after the online video has been played for 3 minutes and 56 seconds, thereby ensuring that the UE can still obtain continuous video data when the UE is handed over between the access network devices.

In conclusion, according to the MEC platform handover method provided in this embodiment of the present invention, after determining that the to-be-handed-over UE needs to be handed over between the access network devices, the source access network device may send the handover notification to the source MEC platform. The source MEC platform may determine the tunnel endpoint identifier (TEID) of the to-be-handed-over UE according to the handover notification, and obtain the context of the to-be-handed-over UE. The context of the to-be-handed-over UE includes the information about the source application that is providing a service to the to-be-handed-over UE. Then, the source MEC platform may send the context of the to-be-handed-over UE to the target MEC platform, so that the target MEC platform obtains the application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figure 6:
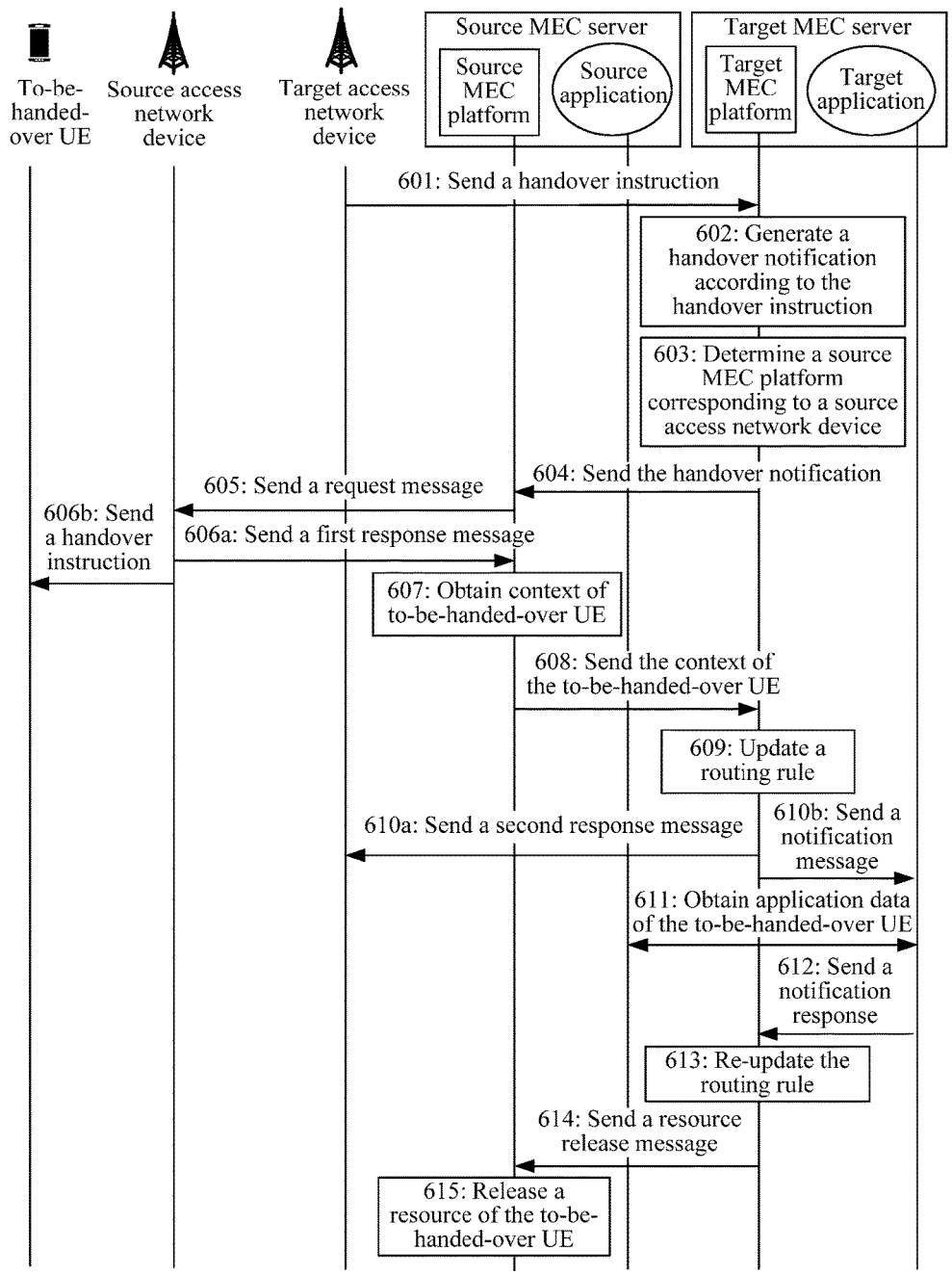
FIG. 6 is a flowchart of still another MEC platform handover method according to an embodiment of the present invention.

According to another aspect, in an embodiment of the present invention, another MEC platform handover method provided in this embodiment of the present invention is described in detail by using an example in which a target MEC platform sends a handover notification to a source MEC platform in an X2 interface-based handover procedure in an LTE system. As shown in FIG. 6, the method may be applied to the system shown in FIG. 1-3. The method includes the following steps.

Step 601: A target access network device sends a handover instruction to a target MEC platform.

When receiving a handover request sent by a source access network device (in an X2 interface-based handover) or a handover request sent by a target MME (in an S1 interface-based handover), the target access network device may send a handover instruction to the target MEC platform. Then, a handover procedure between the access network devices and a handover procedure between MEC platforms may be performed in parallel. The handover instruction sent by the target access network device includes an identifier of to-be-handed-over UE and an identifier of the source access network device. The handover instruction is used to instruct to the to-be-handed-over UE to be handed over between the access network devices. The identifier of the to-be-handed-over UE may be a cell radio network temporary identifier (C-RNTI) allocated by the source access network device to the UE.

Step 602: The target MEC platform generates a handover notification according to the handover instruction.

After receiving the handover instruction, the target MEC platform can determine that the to-be-handed-over UE needs to be handed over between the access network devices, and therefore determine that the source MEC platform corresponding to the source access network device that is accessed by the to-be-handed-over UE needs to perform platform handover for the to-be-handed-over UE. Therefore, the target MEC platform may generate the handover notification according to the handover instruction. The handover notification includes the identifier of to-be-handed-over UE and the identifier of the source access network device.

Step 603: The target MEC platform determines, according to an identifier of a source access network device and a preset correspondence between an access network device and an MEC platform, a source MEC platform corresponding to the source access network device.

The target MEC platform may store the correspondence between an access network device and an MEC platform. The target MEC platform may determine, from the correspondence according to the identifier of the source access network device included in the handover instruction, the source MEC platform corresponding to the source access network device.

Step 604: The target MEC platform sends the handover notification to the source MEC platform.

After determining the source MEC platform, the target MEC platform may send the handover notification to the source MEC platform. The handover notification includes the identifier of the to-be-handed-over UE and the identifier of the source access network device.

Step 605: The source MEC platform sends a request message to the source access network device.

The request message is used to obtain a TEID of the to-be-handed-over UE, and the request message includes the identifier of the to-be-handed-over UE. After receiving the handover notification sent by the target MEC platform, the source MEC platform may determine that platform handover needs to be performed for the to-be-handed-over UE. That is, the source MEC platform needs to send context of the to-be-handed-over UE to the target MEC platform. The identifier of the to-be-handed-over UE included in the handover notification received by the source MEC platform is allocated by the source access network device to UE, and the source MEC platform cannot identify the UE according to the identifier of the to-be-handed-over UE. Therefore, the source MEC platform may send the request message to the source access network device according to the identifier of the source access network device included in the handover notification. The request message includes the identifier of the to-be-handed-over UE.

Step 606a: The source access network device sends a first response message to the source MEC platform.

The first response message carries the TEID of the to-be-handed-over UE. After receiving the request message sent by the source MEC platform, the source access network device may find the TEID of the to-be-handed-over UE from a prestored correspondence between an identifier and a TEID according to the identifier of the to-be-handed-over UE in the request message, generate the first response message according to the TEID of the to-be-handed-over UE, and send the first response message to the source MEC platform, so that the source MEC platform can obtain the context of the to-be-handed-over UE according to the TEID.

Step 606b: The source access network device sends a handover instruction to the to-be-handed-over UE.

After receiving a TEID obtaining request sent by the source MEC platform, the source access network device can determine that the source MEC platform and the target MEC platform have started performing a platform handover procedure. Therefore, the source access network device may send the handover instruction to the to-be-handed-over UE, to instruct the to-be-handed-over UE to be handed over to the target access network device.

If the source access network device has received, before receiving the TEID obtaining request sent by the source MEC platform, a handover response sent by the target access network device (in the X2 interface-based handover procedure) or a handover response sent by the source MME (in the S1 interface-based handover procedure), the source access network device may start a timer. If the TEID obtaining request sent by the source MEC platform is not received within a time period preset on the timer, the source access network device performs an original handover procedure between the access network devices, that is, sends the handover instruction to the to-be-handed-over UE. Alternatively, if the TEID obtaining request sent by the source MEC platform is received within a time period preset on the timer, the source access network device immediately sends the handover instruction to the to-be-handed-over UE.

Step 607: The source MEC platform obtains context of the to-be-handed-over UE.

After receiving the TEID of the to-be-handed-over UE sent by the source access network device, the source MEC platform may obtain, from prestored context of UE, the context of the to-be-handed-over UE according to the TEID. The context of the to-be-handed-over UE includes application information of an application that is being used by the to-be-handed-over UE and a routing rule for the to-be-handed-over UE.

Step 608: The source MEC platform sends the context of the to-be-handed-over UE to the target MEC platform.

Step 609: The target MEC platform updates, according to a routing rule for the to-be-handed-over UE, a routing rule stored on the target MEC platform.

Step 610a: The target MEC platform sends a second response message to the target access network device.

The second response message is used to instruct the target MEC platform to complete the update of the routing rule.

Step 610b: The target MEC platform sends a notification message to a target application corresponding to an identifier of an application.

Step 611: The target application obtains application data of the to-be-handed-over UE from a source application.

Step 612: The target application sends a notification response to the target MEC platform.

Step 613: The target MEC platform re-updates the routing rule.

Step 614: The target MEC platform sends a resource release message to the source MEC platform.

Step 615: The source MEC platform releases a resource of the to-be-handed-over UE according to the resource release message.

The resource release message is used to instruct the source MEC platform to release a resource. In this way, the source MEC platform and the target MEC platform complete the platform handover for the to-be-handed-over UE.

For specific embodiment methods in step 608 to step 615, refer to step 504 to step 506 and step 509 to step 513. Details are not described herein again in this embodiment of the present invention.

In conclusion, according to the MEC platform handover method provided in this embodiment of the present invention, after receiving the handover instruction sent by the target access network device, the target MEC platform may send the handover notification to the source MEC platform. The source MEC platform may determine the tunnel endpoint identifier (TEID) of the to-be-handed-over UE according to the handover notification, and obtain the context of the to-be-handed-over UE. The context of the to-be-handed-over UE includes the application information of the application that is being used by the to-be-handed-over UE. Then, the source MEC platform may send the context of the to-be-handed-over UE to the target MEC platform, so that the target MEC platform obtains the application data of the to-be-handed-over UE according to the application information. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

It should be noted that a sequence of the steps of the MEC platform handover method provided in this embodiment of the present invention may be properly adjusted, and a step may be correspondingly added or omitted according to a situation. Any modification method that can be easily conceived of by a person skilled in the art within the technical scope disclosed in the present invention shall fall within the protection scope of the present invention, and is therefore no longer described in detail.

Figures 1, 7:
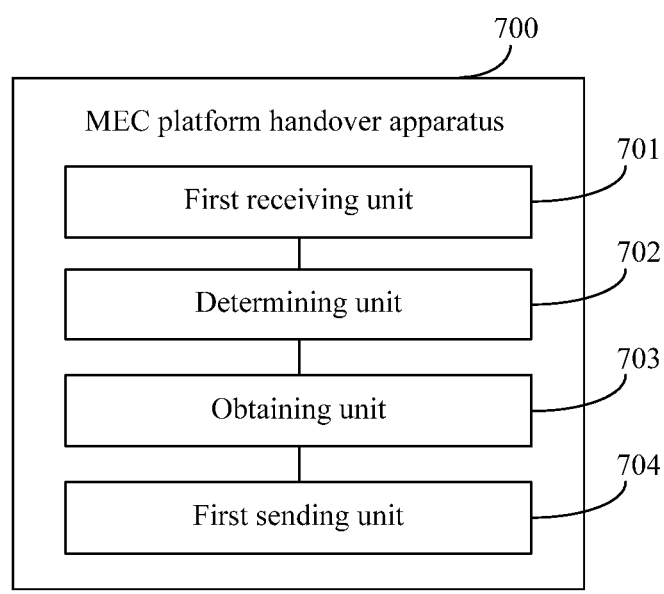
Figures 2, 7:
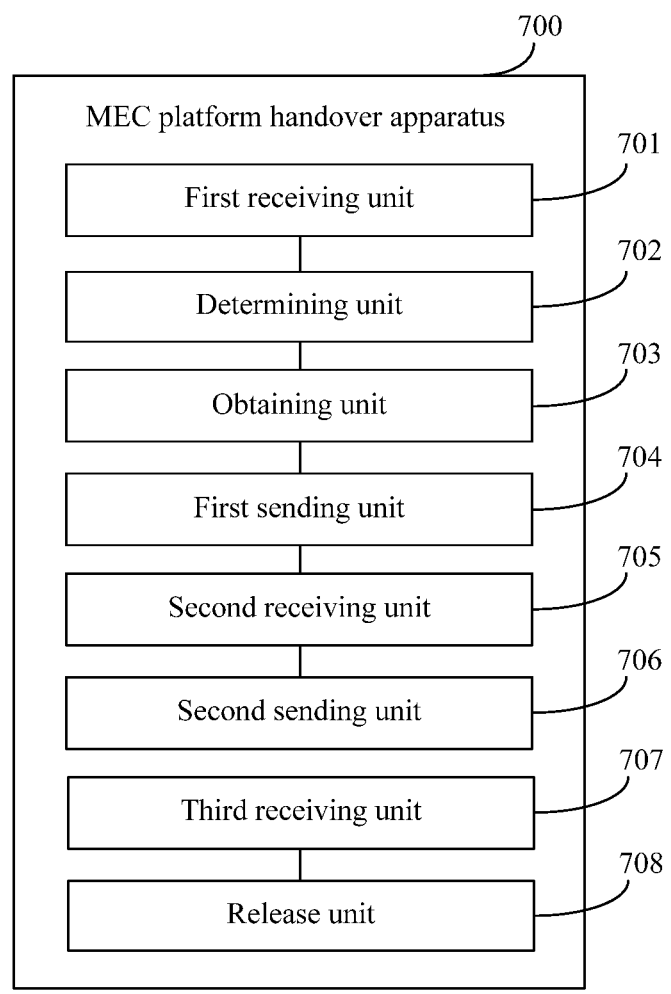

FIG. 7-1 is a schematic diagram of an MEC platform handover apparatus 700 according to an embodiment of the present invention. The apparatus is located on a source MEC platform of to-be-handed-over UE. As shown in FIG. 7-1, the apparatus 700 includes a first receiving unit 701, a determining unit 702, an obtaining unit 703, and a first sending unit 704.

The first receiving unit 701 is configured to receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE.

The determining unit 702 is configured to determine a tunnel endpoint identifier (TEID) of the to-be-handed-over UE according to the handover notification.

The obtaining unit 703 is configured to obtain context of the to-be-handed-over UE according to the TEID of the to-be-handed-over UE, where the context includes information about a source application that is providing a service to the to-be-handed-over UE.

The first sending unit 704 is configured to send the context to the target MEC platform.

In conclusion, according to the MEC platform handover apparatus provided in this embodiment of the present invention, after determining that the to-be-handed-over UE needs to be handed over between the access network devices, the source access network device may send the handover notification to the source MEC platform. The source MEC platform may determine the tunnel endpoint identifier (TEID) of the to-be-handed-over UE according to the handover notification, and obtain the context of the to-be-handed-over UE. The context of the to-be-handed-over UE includes the information about the source application that is providing a service to the to-be-handed-over UE. Then, the source MEC platform may send the context to the target MEC platform, so that the target MEC platform obtains application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

FIG. 7-2 is a schematic diagram of another MEC platform handover apparatus 700 according to an embodiment of the present invention. The apparatus is located on a source MEC platform of to-be-handed-over UE. As shown in FIG. 7-2, the apparatus 700 includes a first receiving unit 701, a determining unit 702, an obtaining unit 703, a first sending unit 704, a second receiving unit 705, a second sending unit 706, a third receiving unit 707, and a release unit 708.

The first receiving unit 701 is configured to receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE.

The determining unit 702 is configured to determine a tunnel endpoint identifier (TEID) of the to-be-handed-over UE according to the handover notification.

The obtaining unit 703 is configured to obtain context of the to-be-handed-over UE according to the TEID of the to-be-handed-over UE, where the context includes information about a source application that is providing a service to the to-be-handed-over UE.

The first sending unit 704 is configured to send the context to the target MEC platform.

The second receiving unit 705 is configured to receive a second response message sent by the target MEC platform, where the second response message is used to instruct the target MEC platform to complete update of a routing rule.

The second sending unit 706 is configured to send a handover response to the source access network device according to the response message, where the handover response is used to instruct the source MEC platform to complete a platform handover for the to-be-handed-over UE.

The third receiving unit 707 is configured to receive a resource release message sent by the target MEC platform, where the resource release message includes an identifier of the to-be-handed-over UE.

The release unit 708 is configured to release a resource of the to-be-handed-over UE according to the resource release message.

Optionally, when the handover notification is the source access network device, the handover notification includes the TEID of the to-be-handed-over UE and an identifier of a target access network device of the to-be-handed-over UE.

The first sending unit 701 is further configured to: determine a target MEC platform corresponding to the target access network device according to the identifier of the target access network device and a preset correspondence between a target access network device and an MEC platform; and send the context to the target MEC platform.

Optionally, when the handover notification device is the target MEC platform of the to-be-handed-over UE, the handover notification includes the identifier of the to-be-handed-over UE.

The determining unit 702 is further configured to: send a request message to the source access network device, where the request message is used to obtain the TEID of the to-be-handed-over UE, and the request message includes the identifier of the to-be-handed-over UE; and receive a first response message sent by the source access network device, where the first response message carries the TEID of the to-be-handed-over UE.

Optionally, the context of the to-be-handed-over UE further includes a routing rule for the to-be-handed-over UE, and the routing rule for the to-be-handed-over UE is used to indicate a rule by which the target MEC platform processes application data of the to-be-handed-over UE.

In conclusion, according to the MEC platform handover apparatus provided in this embodiment of the present invention, after determining that the to-be-handed-over UE needs to be handed over between the access network devices, the source access network device may send the handover notification to the source MEC platform. The source MEC platform may determine the tunnel endpoint identifier (TEID) of the to-be-handed-over UE according to the handover notification, and obtain the context of the to-be-handed-over UE. The context of the to-be-handed-over UE includes the information about the source application that is providing a service to the to-be-handed-over UE. Then, the source MEC platform may send the context to the target MEC platform, so that the target MEC platform obtains the application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figures 1, 8:
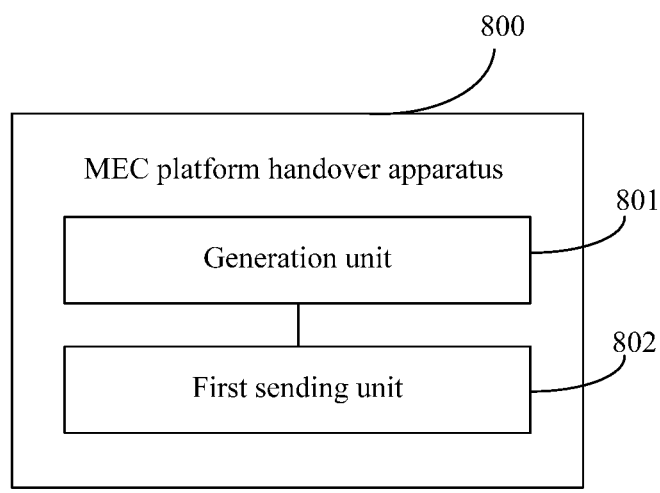
Figures 2, 8:
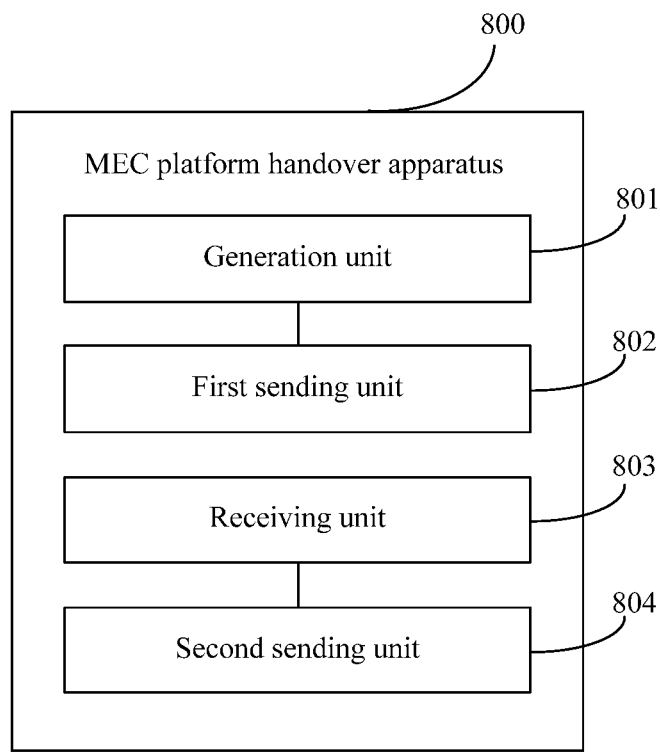

FIG. 8-1 is a schematic diagram of still another MEC platform handover apparatus 800 according to an embodiment of the present invention. The apparatus is located in a handover notification device. The handover notification device is a source access network device of to-be-handed-over UE or a target MEC platform of the to-be-handed-over UE. As shown in FIG. 8-1, the apparatus 800 includes a generation unit 801 and a first sending unit 802.

The generation unit 801 is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE.

The first sending unit 802 is configured to send the handover notification to the source MEC platform.

In conclusion, according to the MEC platform handover apparatus provided in this embodiment of the present invention, when determining that the to-be-handed-over UE needs to be handed over between the access network devices, the source access network device or the target MEC platform may generate the handover notification, and send the handover notification to the source MEC platform. The handover notification is used to instruct the source MEC platform of the to-be-handed-over UE to perform platform handover for the to-be-handed-over UE, so that the source MEC platform sends context of the to-be-handed-over UE to the target MEC platform. The target MEC platform may obtain application data of the to-be-handed-over UE according to information about a source application in the context. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Optionally, when the handover notification device is the target MEC platform of the to-be-handed-over UE, the generation unit 801 is further configured to: receive a handover instruction sent by a target access network device of the to-be-handed-over UE, where the handover instruction includes an identifier of the to-be-handed-over UE and an identifier of the source access network device of the to-be-handed-over UE, and the handover instruction is used to indicate that the to-be-handed-over UE needs to be handed over between the access network devices; and generate the handover notification according to the handover instruction, where the handover notification includes the identifier of the to-be-handed-over UE.

The first sending unit 802 is further configured to: determine a source MEC platform corresponding to the source access network device according to the identifier of the source access network device and a preset correspondence between a source access network device and an MEC platform; and send the handover notification to the source MEC platform.

FIG. 8-2 is a schematic diagram of yet another MEC platform handover apparatus according to an embodiment of the present invention. The apparatus is located in a handover notification device. When the handover notification device is a source access network device, as shown in FIG. 8-2, the apparatus 800 includes a generation unit 801, a first sending unit 802, a receiving unit 803, and a second sending unit 804.

The generation unit 801 is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE.

The first sending unit 802 is configured to send the handover notification to the source MEC platform.

The receiving unit 803 is configured to receive a handover response sent by the source MEC platform, where the handover response is used to instruct the source MEC platform to complete a platform handover for the to-be-handed-over UE.

The second sending unit 804 is configured to send a handover instruction to the to-be-handed-over UE according to the handover response, where the handover instruction is used to instruct the to-be-handed-over UE to be handed over to the target access network device.

Optionally, when the handover notification device is the source access network device of the to-be-handed-over UE, the generation unit 801 is further configured to: receive a measurement report sent by the to-be-handed-over UE; determine, according to the measurement report, that the to-be-handed-over UE needs to be handed over between the access network devices; and generate the handover notification, where the handover notification includes a TEID of the to-be-handed-over UE and an identifier of the target access network device of the to-be-handed-over UE.

In conclusion, according to the MEC platform handover apparatus provided in this embodiment of the present invention, when determining that the to-be-handed-over UE needs to be handed over between the access network devices, the source access network device or the target MEC platform may generate the handover notification, and send the handover notification to the source MEC platform. The handover notification is used to instruct the source MEC platform of the to-be-handed-over UE to perform platform handover for the to-be-handed-over UE, so that the source MEC platform sends context of the to-be-handed-over UE to the target MEC platform. The target MEC platform may obtain application data of the to-be-handed-over UE according to information about a source application in the context. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figures 1, 9:
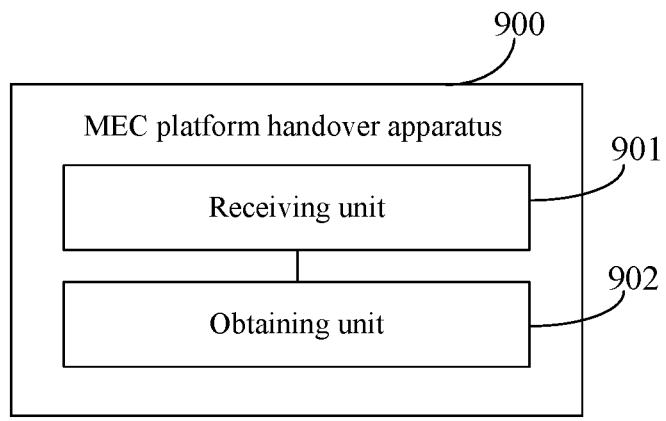
Figures 2, 9:
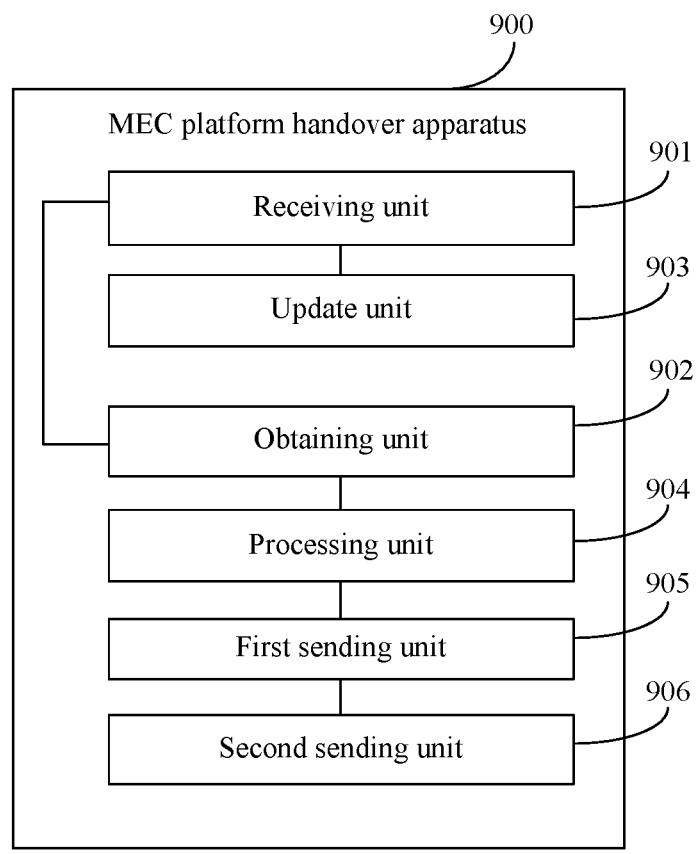

FIG. 9-1 is a schematic diagram of yet another MEC platform handover apparatus 900 according to an embodiment of the present invention. The apparatus is located on a target MEC platform. As shown in FIG. 9-1, the apparatus 900 includes a receiving unit 901 and an obtaining unit 902.

The receiving unit 901 is configured to receive context sent by a source MEC platform, where the context includes information about a source application that is providing a service to the to-be-handed-over UE.

The obtaining unit 902 is configured to obtain, according to the information about the source application, application data of the to-be-handed-over UE from an application deployed on the target MEC platform.

In conclusion, according to the MEC platform handover apparatus provided in this embodiment of the present invention, after receiving the context sent by the source MEC platform, the target MEC platform may obtain, according to the information about the source application that is providing a service to the to-be-handed-over UE, the application data of the to-be-handed-over UE from the application deployed on the target MEC platform, where the information is included in the context of the to-be-handed-over UE, and continue to provide a service to the to-be-handed-over UE according to the application data, thereby ensuring continuity of obtaining application data by the UE from an MEC platform.

FIG. 9-2 is a schematic diagram of yet another MEC platform handover apparatus according to an embodiment of the present invention. The apparatus is located on a target MEC platform. As shown in FIG. 9-2, the apparatus includes a receiving unit 901, an obtaining unit 902, an update unit 903, a processing unit 904, a first sending unit 905, and a second sending unit 906.

The receiving unit 901 is configured to receive context sent by a source MEC platform, where the context includes information about a source application that is providing a service to the to-be-handed-over UE.

The obtaining unit 902 is configured to obtain, according to the information about the source application, application data of the to-be-handed-over UE from an application deployed on the target MEC platform.

The update unit 903 is configured to update, according to a routing rule for the to-be-handed-over UE, a routing rule stored on the target MEC platform.

The processing unit 904 is configured to perform buffering processing on the application data of the to-be-handed-over UE according to the routing rule for the to-be-handed-over UE.

The first sending unit 905 is configured to send the application data of the to-be-handed-over UE that undergoes the buffering processing to the to-be-handed-over UE.

The second sending unit 906 is configured to send a resource release message to the source MEC platform, where the resource release message includes an identifier of the to-be-handed-over UE, and is used to instruct the source MEC platform to release a resource of the to-be-handed-over UE.

Optionally, the information about the source application includes an identifier of the source application, a control plane (CP) Internet Protocol (IP) address of the source application, and an IP of the to-be-handed-over UE. Context of the to-be-handed-over UE further includes the routing rule for the to-be-handed-over UE, and the routing rule for the to-be-handed-over UE is used to indicate a rule by which the target MEC platform processes the application data of the to-be-handed-over UE.

After receiving the context sent by the source MEC platform, the target MEC platform may obtain, according to the information about the source application that is providing a service to the to-be-handed-over UE, the application data of the to-be-handed-over UE from the application deployed on the target MEC platform, where the information is included in the context of the to-be-handed-over UE, and continue to provide a service to the to-be-handed-over UE according to the application data, thereby ensuring continuity of obtaining application data by the UE from an MEC platform.

For the apparatuses in the foregoing embodiments, a specific manner of performing an operation by each unit has been described in detail in the related method embodiments. Details are not described herein.

Figure 10:
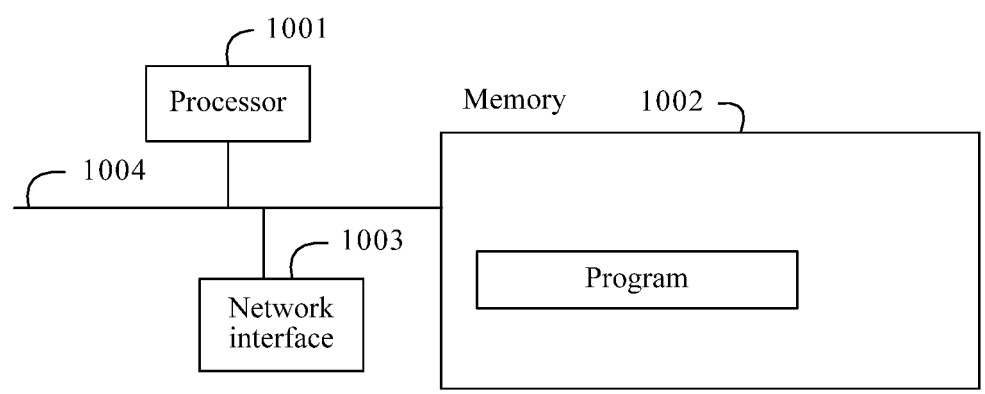
FIG. 10 is a schematic diagram of yet another MEC platform handover apparatus according to an embodiment of the present invention.

FIG. 10 is a schematic diagram of yet another MEC platform handover apparatus according to an embodiment of the present invention. The apparatus is located on a source mobile edge computing (MEC) platform. The apparatus includes a processor 1001, a memory 1002, a network interface 1003, and a bus 1004. The bus 1004 is configured to connect the processor 1001, the memory 1002, and the network interface 1003. The processor 1001 is configured to execute a program stored in the memory 1002.

The network interface 1003 is configured to receive a handover notification sent by a handover notification device, where the handover notification is used to instruct the source MEC platform to perform platform handover for the to-be-handed-over UE, and the handover notification device is a source access network device of the to-be-handed-over UE or a target MEC platform of the to-be-handed-over UE.

The processor 1001 is further configured to determine a tunnel endpoint identifier (TEID) of the to-be-handed-over UE according to the handover notification.

The processor 1001 is further configured to obtain context of the to-be-handed-over UE according to the TEID of the to-be-handed-over UE, where the context includes information about a source application that is providing a service to the to-be-handed-over UE.

The network interface 1003 sends the context to the target MEC platform, so that the target MEC platform obtains application data of the to-be-handed-over UE according to the information about the source application.

Optionally, when the handover notification is the source access network device, the handover notification includes the TEID of the to-be-handed-over UE and an identifier of a target access network device of the to-be-handed-over UE.

The network interface 1003 is further configured to: determine a target MEC platform corresponding to the target access network device according to the identifier of the target access network device and a preset correspondence between a target access network device and an MEC platform; and send the context to the target MEC platform.

Optionally, when the handover notification device is the target MEC platform of the to-be-handed-over UE, the handover notification includes an identifier of the to-be-handed-over UE. The network interface 1003 is further configured to: send a request message to the source access network device, where the request message is used to obtain the TEID of the to-be-handed-over UE, and the request message includes the identifier of the to-be-handed-over UE;

and receive a first response message sent by the source access network device, where the first response message carries the TEID of the to-be-handed-over UE.

Optionally, the context of the to-be-handed-over UE further includes a routing rule for the to-be-handed-over UE, and the routing rule for the to-be-handed-over UE is used to indicate a rule by which the target MEC platform processes the application data of the to-be-handed-over UE.

Optionally, the network interface 1003 is further configured to: receive a second response message sent by the target MEC platform, where the second response message is used to instruct the target MEC platform to complete update of a routing rule; and send a handover response to the source access network device according to the response message, where the handover response is used to instruct the source MEC platform to complete a platform handover for the to-be-handed-over UE.

In conclusion, according to the MEC platform handover apparatus provided in this embodiment of the present invention, after receiving the handover notification sent by the source access network device or the target MEC platform, the source MEC platform may determine the tunnel endpoint identifier (TEID) of the to-be-handed-over UE according to the handover notification, and obtain the context of the to-be-handed-over UE. The context includes the information about the source application that is providing a service to the to-be-handed-over UE. Then, the source MEC platform may send the context to the target MEC platform, so that the target MEC platform obtains application data of the to-be-handed-over UE according to the information about the source application. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figures 1, 11:
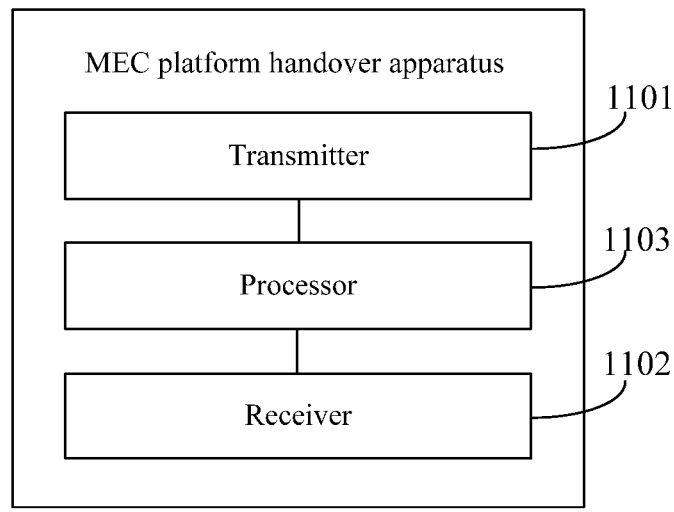
Figures 2, 11:
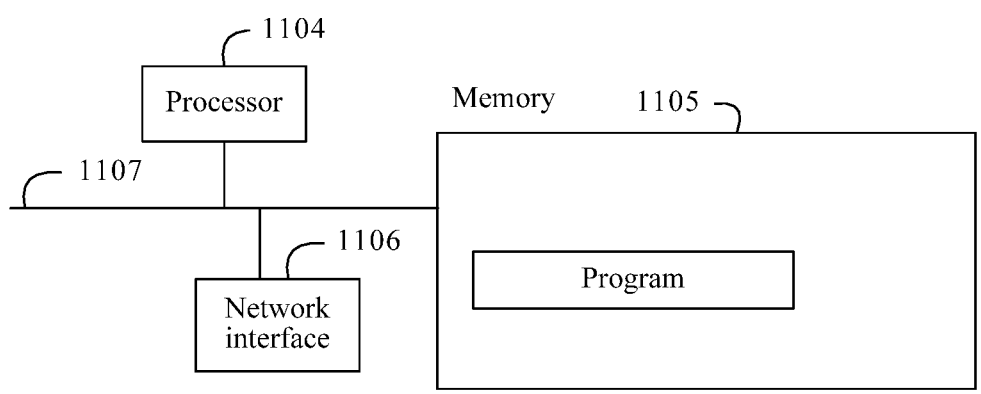

FIG. 11-1 is a schematic diagram of yet another MEC platform handover apparatus according to an embodiment of the present invention. The apparatus is located in a handover notification device. The handover notification device is a source access network device or a target MEC platform. When the handover notification device is the source access network device, the apparatus includes a transmitter 1101, a receiver 1102, and a processor 1103.

The processor 1103 is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE.

The transmitter 1101 is configured to send the handover notification to the source MEC platform.

When the handover notification device is the target MEC platform, as shown in FIG. 11-2, the apparatus includes a processor 1104, a memory 1105, a network interface 1106, and a bus 1107. The bus 1107 is configured to connect the processor 1104, the memory 1105, and the network interface 1106. The processor 1104 is configured to execute a program stored in the memory 1105.

The processor 1104 is configured to generate a handover notification when it is determined that the to-be-handed-over UE needs to be handed over between access network devices, where the handover notification is used to instruct a source MEC platform of the to-be-handed-over UE to perform platform handover for the to-be-handed-over UE.

The network interface 1106 is configured to send the handover notification to the source MEC platform.

Optionally, when the handover notification device is the source access network device, the receiver 1102 receives a measurement report sent by the to-be-handed-over UE.

The processor 1103 is further configured to determine, according to the measurement report, that the to-be-handed-over UE needs to be handed over between the access network devices; and generate the handover notification, where the handover notification includes a TEID of the to-be-handed-over UE and an identifier of a target access network device of the to-be-handed-over UE.

Optionally, the receiver 1102 is further configured to receive a handover response sent by the source MEC platform, where the handover response is used to instruct the source MEC platform to complete a platform handover for the to-be-handed-over UE; and The transmitter 1101 is configured send a handover instruction to the to-be-handed-over UE according to the handover response, where the handover instruction is used to instruct the to-be-handed-over UE to be handed over to the target access network device.

Optionally, when the handover notification device is the target MEC platform, the network interface 1106 is further configured to: receive a handover instruction sent by a target access network device of the to-be-handed-over UE, where the handover instruction includes an identifier of the to-be-handed-over UE and an identifier of the source access network device of the to-be-handed-over UE, and the handover instruction is used to indicate that the to-be-handed-over UE needs to be handed over between the access network devices.

The processor 1104 is further configured to generate the handover notification according to the handover instruction, where the handover notification includes the identifier of the to-be-handed-over UE.

The network interface 1106 is further configured to: determine a source MEC platform corresponding to the source access network device according to the identifier of the source access network device and a preset correspondence between a source access network device and an MEC platform; and send the handover notification to the source MEC platform.

In conclusion, according to the MEC platform handover apparatus provided in this embodiment of the present invention, when determining that the to-be-handed-over UE needs to be handed over between the access network devices, the source access network device or the target MEC platform may generate the handover notification, and send the handover notification to the source MEC platform. The handover notification is used to instruct the source MEC platform of the to-be-handed-over UE to perform platform handover for the to-be-handed-over UE, so that the source MEC platform sends context of the to-be-handed-over UE to the target MEC platform. The target MEC platform may obtain application data of the to-be-handed-over UE according to information about a source application in the context. Therefore, after the to-be-handed-over UE is handed over between the access network devices, the target MEC platform can continue to provide a service to the to-be-handed-over UE according to the obtained application data of the to-be-handed-over UE, thereby ensuring continuity of obtaining application data by the UE from an MEC platform.

Figure 12:
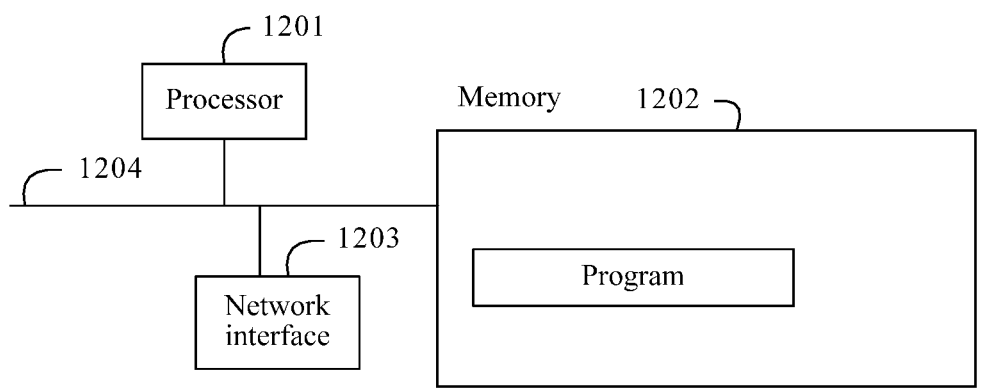
FIG. 12 is a schematic diagram of yet another MEC platform handover apparatus according to an embodiment of the present invention.

FIG. 12 is a schematic diagram of yet another MEC platform handover apparatus according to an embodiment of the present invention. The apparatus is located on a target MEC platform of to-be-handed-over UE. The apparatus includes a processor 1201, a memory 1202, a network interface 1203, and a bus 1204. The bus 1204 is configured to connect the processor 1201, the memory 1202, and the network interface 1203. The processor 1201 is configured to execute a program stored in the memory 1202.

The network interface 1203 is configured to receive context sent by a source MEC platform, where the context includes information about a source application that is providing a service to the to-be-handed-over UE.

The context of the to-be-handed-over UE is obtained by the source MEC platform after receiving a handover notification sent by a handover notification device and determining a TEID of the to-be-handed-over UE according to the handover notification. The handover notification device is a source access network device of the to-be-handed-over UE or the target MEC platform of the to-be-handed-over UE.

The processor 1201 is further configured to obtain, according to the information about the source application, application data of the to-be-handed-over UE from an application deployed on the target MEC platform.

Optionally, the information about the source application includes an identifier of the source application, a control plane (CP) Internet Protocol (IP) address of the source application, and an IP of the to-be-handed-over UE.

Optionally, the processor 1201 is further configured to: obtain, from the target MEC platform, a target application corresponding to the identifier of the source application.

The network interface 1203 is further configured to: send a notification message to the target application, where the notification message includes the CP IP of the source application and the IP of the to-be-handed-over UE, and the notification message is used to instruct the target application to obtain the application data of the to-be-handed-over UE; and receive the application data of the to-be-handed-over UE that is sent by the target application, where the application data of the to-be-handed-over UE is obtained by the target application from the source application according to the CP IP of the source application and the IP of the to-be-handed-over UE.

Optionally, the context of the to-be-handed-over UE further includes a routing rule for the to-be-handed-over UE, and the routing rule for the to-be-handed-over UE is used to indicate a rule by which the target MEC platform processes the application data of the to-be-handed-over UE. The processor 1201 is further configured to: update, according to the routing rule for the to-be-handed-over UE, a routing rule stored on the target MEC platform.

Optionally, the processor 1201 is further configured to: perform buffering processing on the application data of the to-be-handed-over UE according to the routing rule for the to-be-handed-over UE.

The network interface 1203 is further configured to send the application data of the to-be-handed-over UE that undergoes the buffering processing to the to-be-handed-over UE.

Optionally, the network interface 1203 is further configured to: send a resource release message to the source MEC platform, where the resource release message includes an identifier of the to-be-handed-over UE, and is used to instruct the source MEC platform to release a resource of the to-be-handed-over UE.

In conclusion, according to the MEC platform handover apparatus provided in this embodiment of the present invention, after receiving the context sent by the source MEC platform, the target MEC platform may obtain, according to the information about the source application that is providing a service to the to-be-handed-over UE, the application data of the to-be-handed-over UE from the application deployed on the target MEC platform, where the information is included in the context of the to-be-handed-over UE, and continue to provide a service to the to-be-handed-over UE according to the application data, thereby ensuring continuity of obtaining application data by the UE from an MEC platform.

An embodiment of the present invention provides an MEC platform handover system. The system includes to-be-handed-over user equipment (UE), a source access network device of the to-be-handed-over UE, a target access network device of the to-be-handed-over UE, a source MEC platform of the to-be-handed-over UE, and a target MEC platform of the to-be-handed-over UE. The source access network device or the target MEC platform is a handover notification device.

The source MEC platform includes the MEC platform handover apparatus shown in FIG. 7-1 or FIG. 7-2.

The target MEC platform includes the MEC platform handover apparatus shown in FIG. 9-1 or FIG. 9-2.

The handover notification device includes the MEC platform handover apparatus shown in FIG. 8-1 or FIG. 8-2.

An embodiment of the present invention provides another MEC platform handover system. The system includes to-be-handed-over user equipment (UE), a source access network device of the to-be-handed-over UE, a target access network device of the to-be-handed-over UE, a source MEC platform of the to-be-handed-over UE, and a target MEC platform of the to-be-handed-over UE. The source access network device or the target MEC platform is a handover notification device.

The source MEC platform includes the MEC platform handover apparatus shown in FIG. 10.

The target MEC platform includes the MEC platform handover apparatus shown in FIG. 12.

The handover notification device includes the MEC platform handover apparatus shown in FIG. 11-1 or FIG. 11-2.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from a scope of the present invention shall fall within the protection scope of the present invention.

What is claimed is:

1. A mobile edge computing (MEC) platform handover apparatus, wherein the apparatus is located on a source MEC platform of to-be-handed-over user equipment (UE), and the apparatus comprises:

a receiver, configured to receive a handover notification sent by a handover notification device, wherein the handover notification is used to instruct the source MEC platform to perform platform handover for the to-be-handed-over UE, and the handover notification device is a source access network device of the to-be-handed-over UE or a target MEC platform of the to-be-handed-over UE;

a processor, configured to determine a tunnel endpoint identifier (TEID) of the to-be-handed-over UE according to the handover notification; and obtain context of the to-be-handed-over UE according to the TEID of the to-be-handed-over UE, wherein the context comprises information about a source application that is providing a service to the to-be-handed-over UE; and a transmitter, configured to send the context to the target MEC platform.

2. The apparatus according to claim 1, wherein when the handover notification device is the source access network device, the handover notification comprises the TEID of the to-be-handed-over UE and an identifier of a target access network device of the to-be-handed-over UE; and the processor is further configured to determine a target MEC platform corresponding to the target access network device according to the identifier of the target access network device and a preset correspondence between a target access network device and an MEC platform; and the transmitter is further configured to send the context to the target MEC platform.

3. The apparatus according to claim 1, wherein when the handover notification device is the target MEC platform of the to-be-handed-over UE, the handover notification comprises an identifier of the to-be-handed-over UE; and the transmitter is further configured to send a request message to the source access network device, wherein the request message is used to obtain the TEID of the to-be-handed-over UE, and the request message comprises the identifier of the to-be-handed-over UE; and the receiver is further configured to receive a first response message sent by the source access network device, wherein the first response message carries the TEID of the to-be-handed-over UE.

4. The apparatus according to claim 1, wherein the context further comprises a routing rule for the to-be-handed-over UE, and the routing rule for the to-be-handed-over UE is used to indicate a rule by which the target MEC platform processes application data of the to-be-handed-over UE.

5. The apparatus according to claim 2, wherein the receiver is further configured to receive a second response message sent by the target MEC platform, wherein the second response message is used to instruct the target MEC platform to complete update of a routing rule; and the transmitter is further configured to send a handover response to the source access network device according to the second response message, wherein the handover response is used to instruct the source MEC platform to complete a platform handover for the to-be-handed-over UE.

6. The apparatus according to claim 1, wherein the receiver is further configured to receive a resource release message sent by the target MEC platform, wherein the resource release message comprises the identifier of the to-be-handed-over UE; and the processor is further configured to release a resource of the to-be-handed-over UE according to the resource release message.

7. A mobile edge computing (MEC) platform handover apparatus, wherein the apparatus is located in a handover notification device, and the handover notification device is a source access network device of to-be-handed-over user equipment (UE) or a target MEC platform of the to-be-handed-over UE; and the apparatus comprises:

a processor, configured to generate a handover notification when it is determined that the to-be-handed-over UE needs to be handed over between access network devices, wherein the handover notification is used to instruct a source MEC platform of the to-be-handed-over UE to perform platform handover for the to-be-handed-over UE; and a transmitter, configured to send the handover notification to the source MEC platform.

8. The apparatus according to claim 7, wherein when the handover notification device is the source access network device of the to-be-handed-over UE, the apparatus further comprises:

a receiver, configured to receive a measurement report sent by the to-be-handed-over UE;

the processor is configured to determine, according to the measurement report, that the to-be-handed-over UE needs to be handed over between the access network devices; and generate the handover notification, wherein the handover notification comprises a tunnel endpoint identifier (TEID) of the to-be-handed-over UE and an identifier of a target access network device of the to-be-handed-over UE.

9. The apparatus according to claim 7, wherein when the handover notification device is the target MEC platform of the to-be-handed-over UE, the apparatus further comprises:

a receiver, configured to receive a handover instruction sent by a target access network device of the to-be-handed-over UE, wherein the handover instruction comprises an identifier of the to-be-handed-over UE and an identifier of the source access network device of the to-be-handed-over UE, and the handover instruction is used to indicate that the to-be-handed-over UE needs to be handed over between the access network devices; and the processor is configured to generate the handover notification according to the handover instruction, wherein the handover notification comprises the identifier of the to-be-handed-over UE;

the processor is further configured to determine a source MEC platform corresponding to the source access network device according to the identifier of the source access network device and a preset correspondence between a source access network device and an MEC platform; and the transmitter is configured to send the handover notification to the source MEC platform.

10. The apparatus according to claim 8, wherein the receiver is further configured to receive a handover response sent by the source MEC platform, wherein the handover response is used to instruct the source MEC platform to complete a platform handover for the to-be-handed-over UE; and the transmitter is further configured to send a handover instruction to the to-be-handed-over UE according to the handover response, wherein the handover instruction is used to instruct the to-be-handed-over UE to be handed over to the target access network device.

11. A mobile edge computing (MEC) platform handover apparatus, wherein the apparatus is located on a target MEC platform of to-be-handed-over user equipment (UE), and the apparatus comprises:

a receiver, configured to receive context sent by a source MEC platform of the to-be-handed-over UE, wherein the context comprises information about a source application that is providing a service to the to-be-handed-over UE; and a processor, configured to obtain, according to the information about the source application, application data of the to-be-handed-over UE from an application deployed on the target MEC platform.

12. The apparatus according to claim 11, wherein the information about the source application comprises an identifier of the source application, a control plane (CP) Internet Protocol (IP) address of the source application, and an IP of the to-be-handed-over UE.

13. The apparatus according to claim 12, wherein the processor is further configured to obtain, from the target MEC platform, a target application corresponding to the identifier of the source application;
wherein the apparatus further comprises: a transmitter, configured to send a notification message to the target application, wherein the notification message comprises the CP IP of the source application and the IP of the to-be-handed-over UE, and the notification message is used to instruct the target application to obtain the application data of the to-be-handed-over UE; and
the receiver is configured to receive the application data of the to-be-handed-over UE that is sent by the target application, wherein the application data of the to-be-handed-over UE is obtained by the target application from the source application according to the CP IP of the source application and the IP of the to-be-handed-over UE.

14. The apparatus according to claim 11, wherein the context further comprises a routing rule for the to-be-handed-over UE, and the routing rule for the to-be-handed-over UE is used to indicate a rule by which the target MEC platform processes the application data of the to-be-handed-over UE; and the processor is further configured to update, according to the routing rule for the to-be-handed-over UE, a routing rule stored on the target MEC platform.

15. The apparatus according to claim 14, wherein the processor is configured to perform buffering processing on the application data of the to-be-handed-over UE according to the routing rule for the to-be-handed-over UE; and
the apparatus further comprises: a transmitter, configured to send the application data of the to-be-handed-over UE that undergoes the buffering processing to the to-be-handed-over UE.

16. The apparatus according to claim 11, wherein the apparatus further comprises:
a transmitter, configured to send a resource release message to the source MEC platform, wherein the resource release message comprises an identifier of the to-be-handed-over UE, and is used to instruct the source MEC platform to release a resource of the to-be-handed-over UE.

* * * * *